(12) United States Patent
Aoki et al.

(10) Patent No.: US 6,931,146 B2
(45) Date of Patent: Aug. 16, 2005

(54) METHOD AND APPARATUS FOR DETECTING MOVING OBJECT

(75) Inventors: Takahiro Aoki, Kawasaki (JP); Osafumi Nakayama, Kawasaki (JP); Morito Shiohara, Kawasaki (JP); Yoshishige Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 702 days.

(21) Appl. No.: 09/731,010

(22) Filed: Dec. 7, 2000

(65) Prior Publication Data

US 2001/0004400 A1 Jun. 21, 2001

(30) Foreign Application Priority Data

Dec. 20, 1999 (JP) .......................................... 11-361641

(51) Int. Cl.[7] ................................................ G06K 9/00
(52) U.S. Cl. ...................... 382/107; 348/155; 356/27; 73/488
(58) Field of Search ................................ 382/100, 103, 382/107; 348/154, 155, 352, 407.1; 356/27; 73/488

(56) References Cited

U.S. PATENT DOCUMENTS

| 5,748,775 | A | * | 5/1998 | Tsuchikawa et al. | ........ 382/190 |
| 5,969,755 | A | * | 10/1999 | Courtney | ..................... 348/143 |
| 6,130,707 | A | * | 10/2000 | Koller et al. | ................ 348/155 |
| 6,298,143 | B1 | * | 10/2001 | Kikuchi et al. | ............. 382/103 |
| 6,591,015 | B1 | * | 7/2003 | Yasunari et al. | ............. 382/236 |

FOREIGN PATENT DOCUMENTS

| JP | HEI 5-174261 | 7/1993 |
| JP | HEI 8-106534 | 4/1996 |
| JP | HEI 8-167022 | 6/1996 |
| JP | HEI 8-249471 | 9/1996 |
| JP | HEI 9-81753 | 3/1997 |

OTHER PUBLICATIONS

S. Nagaya, et al., "Moving Object Detection by Time–Correlation–Based Background Judgement Method," The Institute of Electronics, Information and Communication Engineers, Thesis Review (D–II), vol. J79–D–II, No. 4, pp. 568–576, Apr. 1996.

H. Habe, et al., "A Robust Background Subtraction Method for Non–Stationary Scenes," Meeting on Image Recognition and Understanding, MIRU '98, Jul. 1998.

* cited by examiner

*Primary Examiner*—Samir Ahmed
*Assistant Examiner*—Anand Bhatnagar
(74) *Attorney, Agent, or Firm*—Staas & Halsey LLP

(57) ABSTRACT

For automatically detecting a moving object in an input image taken using a monitor camera or the like, an apparatus includes an input image extracting section, an input image retaining section, a background image retaining section, a background difference calculating section, a moving direction recognizing section, and a united judging section. A movement of an object is detected with precision even in an environment where illumination varies, irrespective of the relative position of a ridge line of the object and a border of unit blocks. And only the moving object can be detected stably even when the camera encounters swing, vibration, etc.

27 Claims, 32 Drawing Sheets

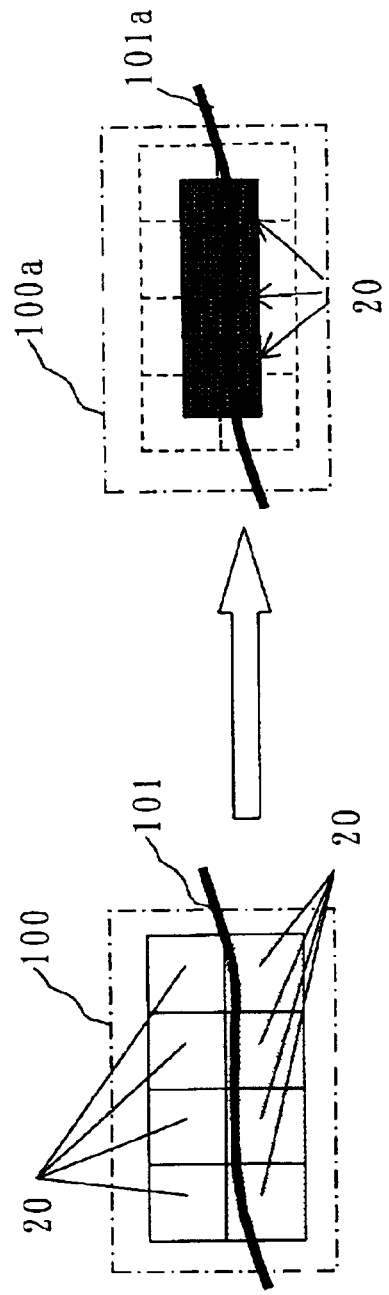

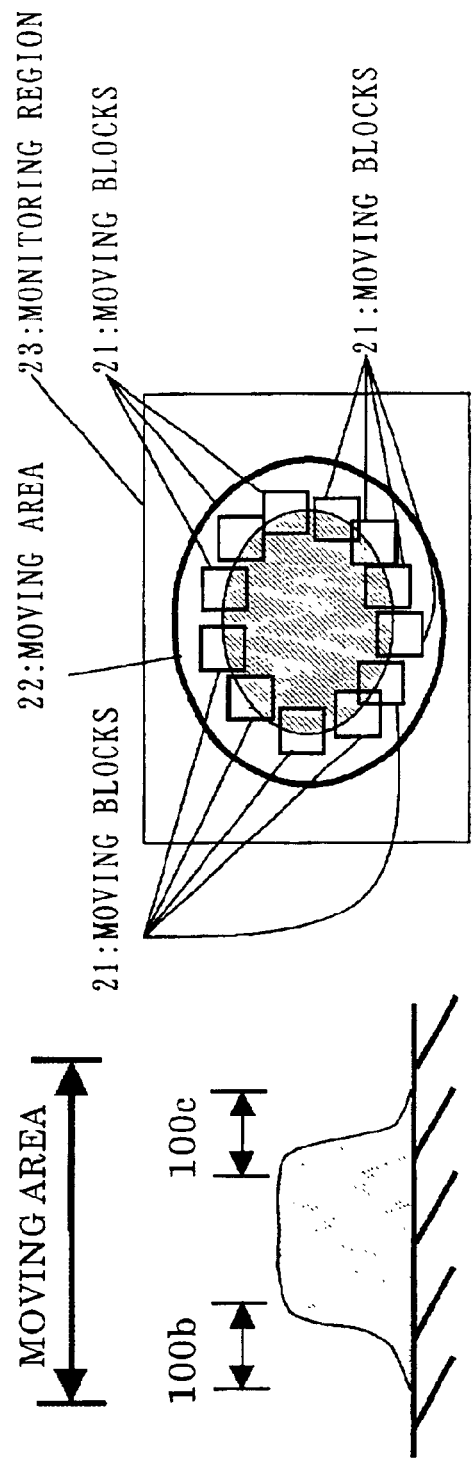

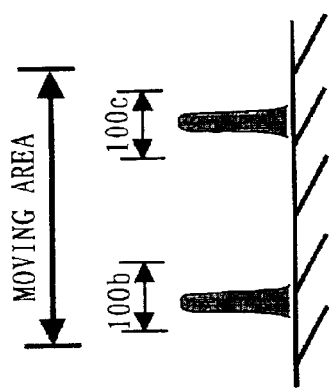
F I G. 5(a)
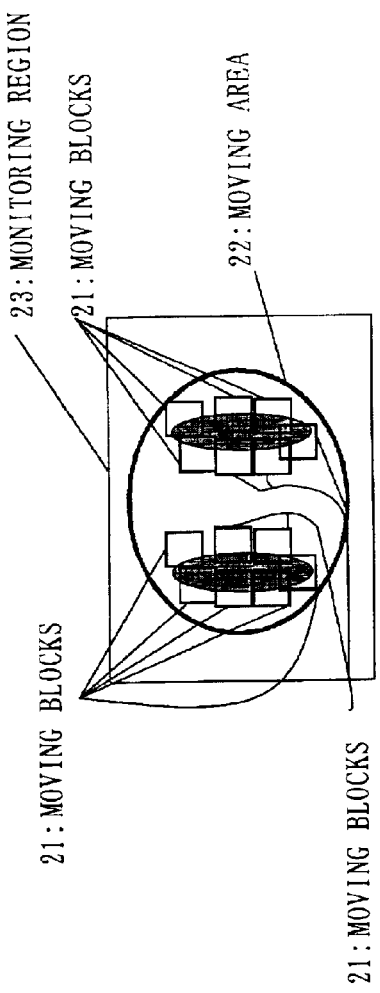
F I G. 5(b)

FIG. 7(a) BACKGROUND IMAGE
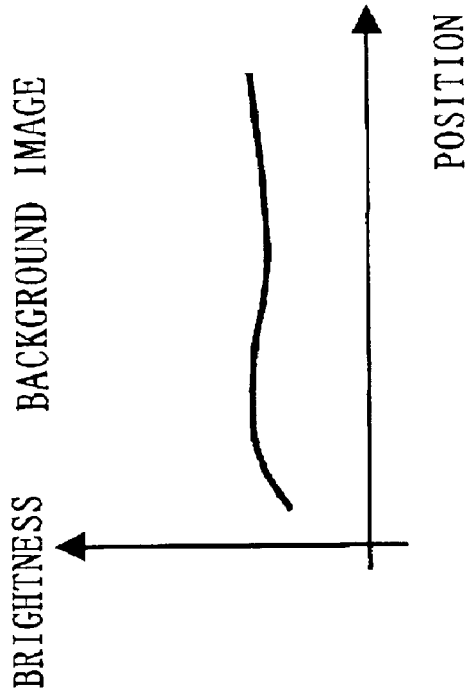
FIG. 7(b) INPUT IMAGE

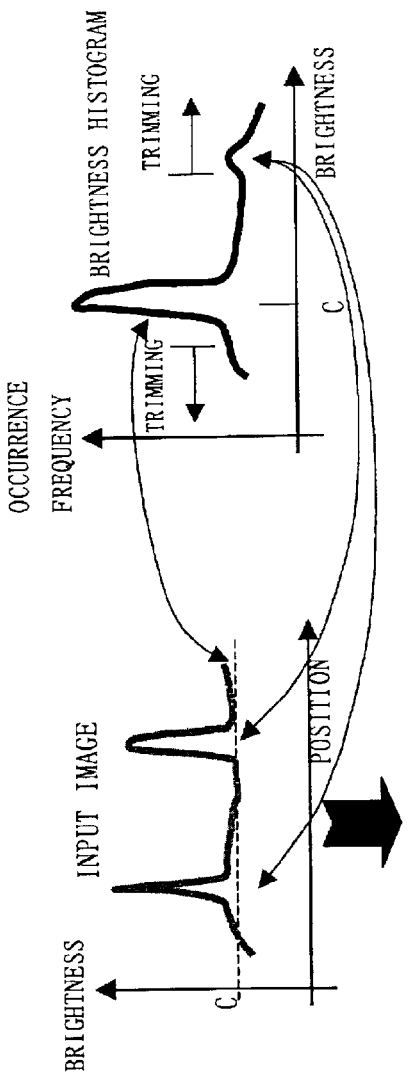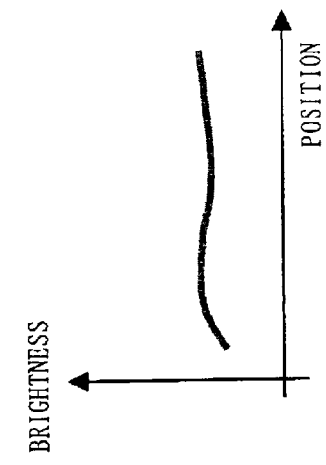

OBJECT ENTERS

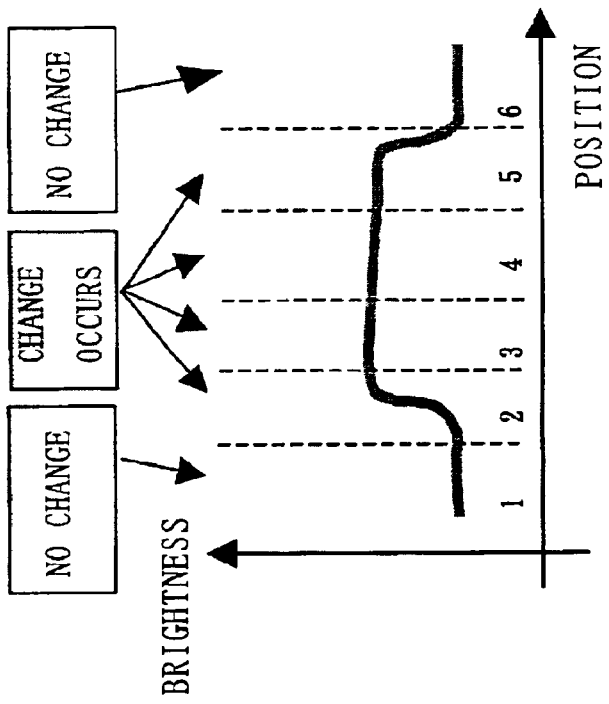
F I G. 14 (a)
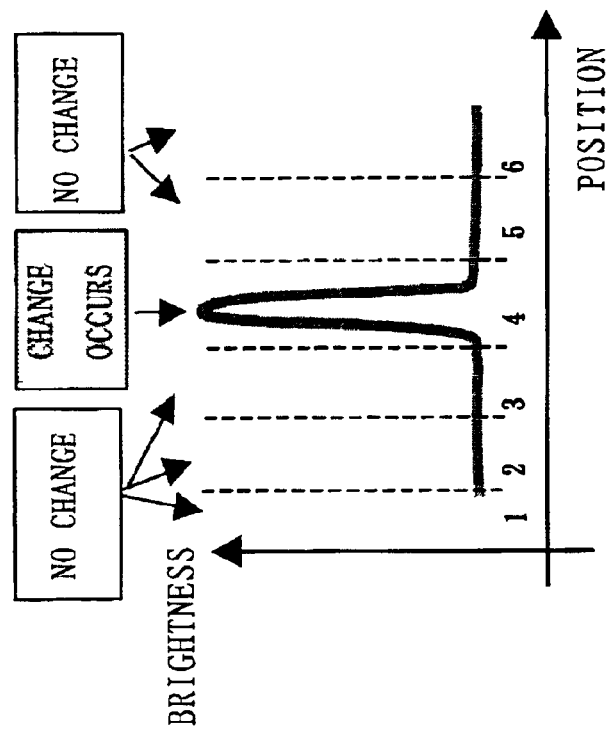
F I G. 14 (b)

F I G. 15
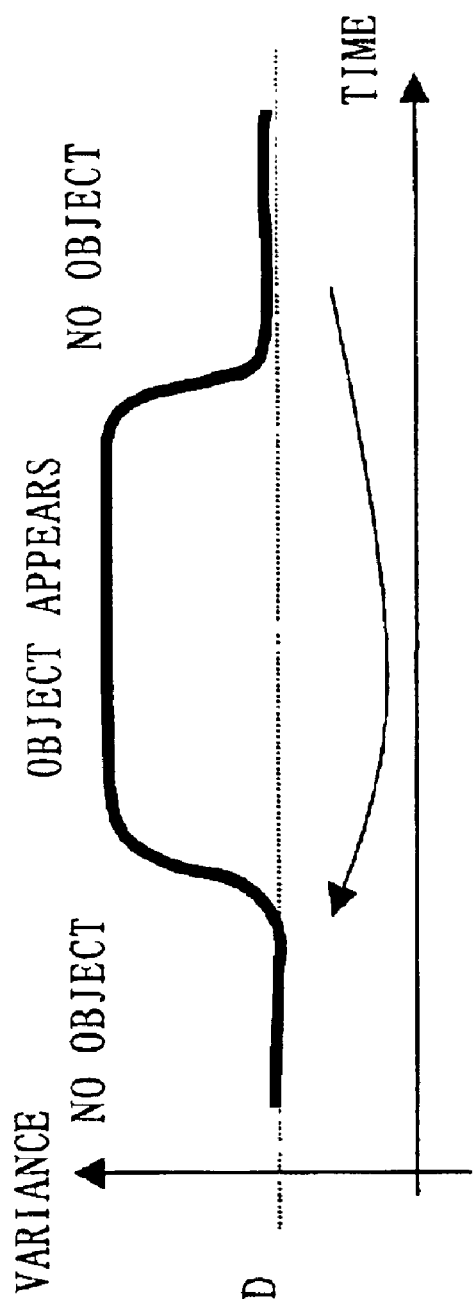

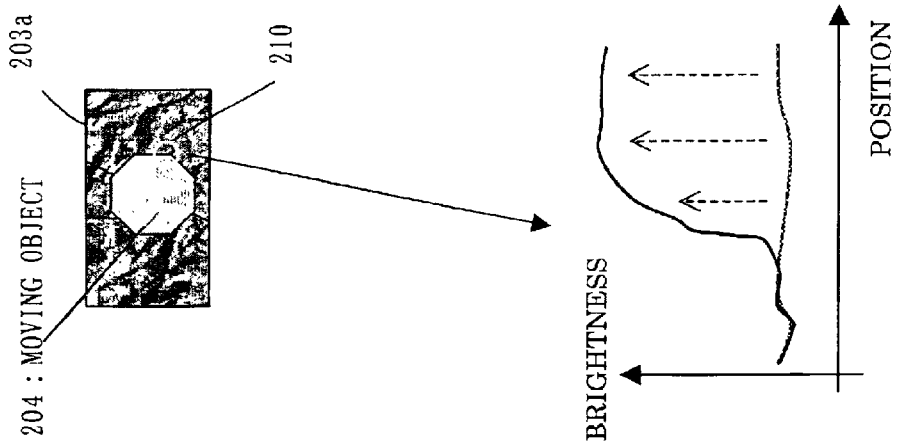
F I G. 27 (a)
F I G. 27 (b)

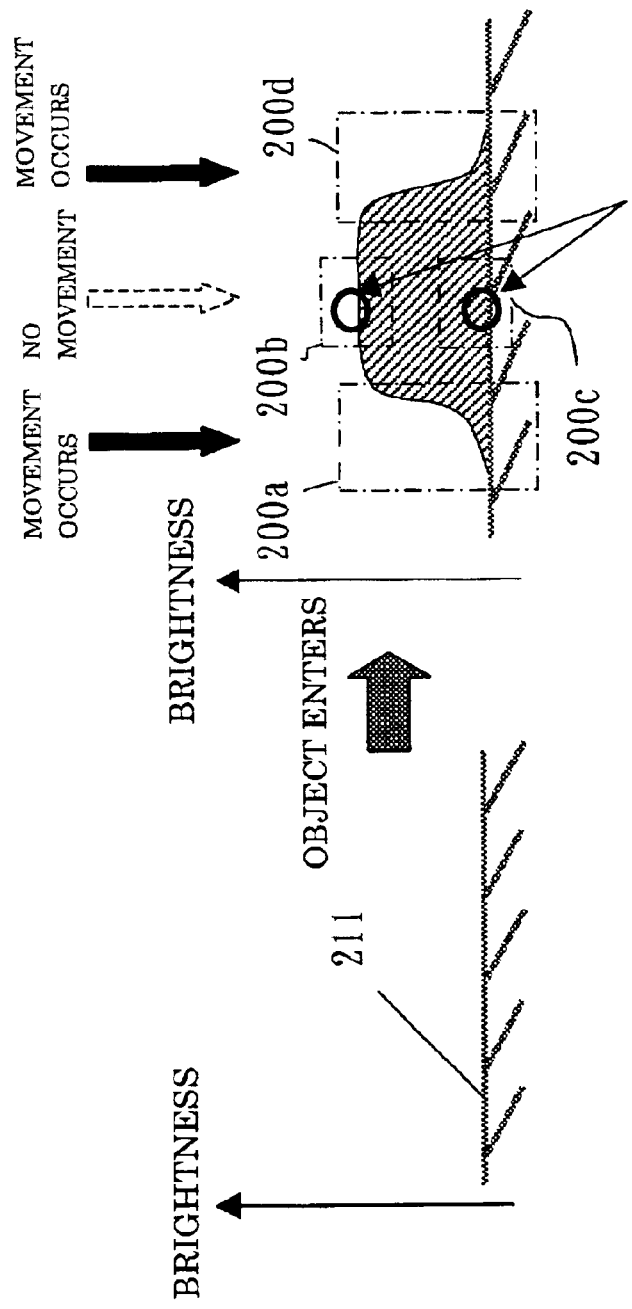

F I G. 29(b)
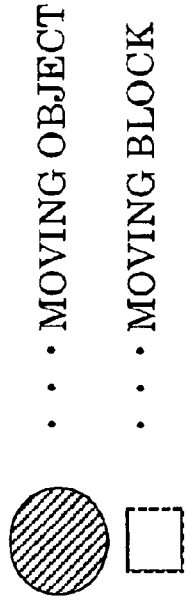
・・・MOVING OBJECT
・・・MOVING BLOCK
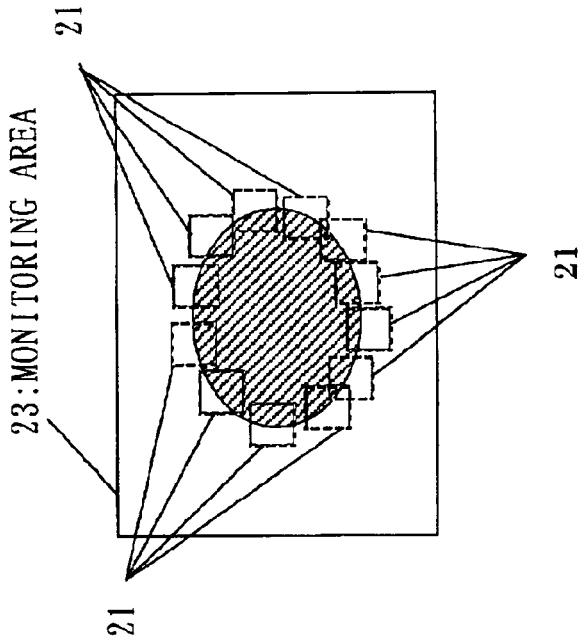
23: MONITORING AREA
21
F I G. 29(a)
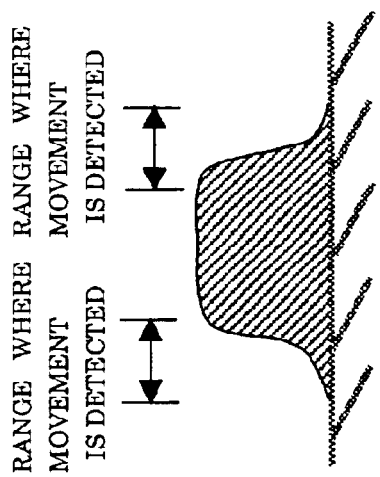
RANGE WHERE MOVEMENT IS DETECTED
RANGE WHERE MOVEMENT IS DETECTED

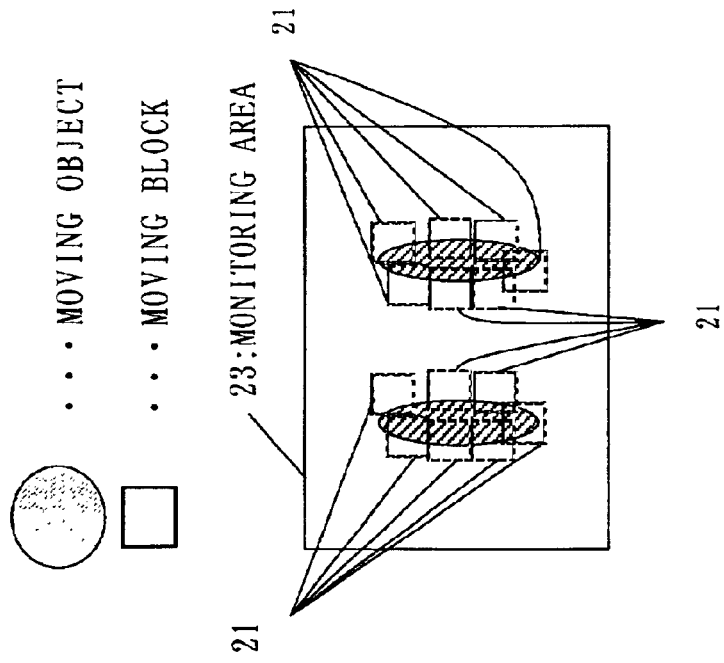
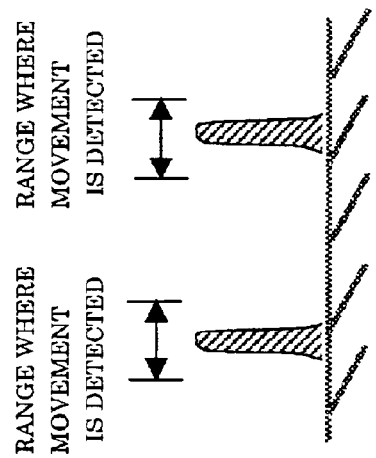
FIG. 30(a)
FIG. 30(b)

CHANGE DUE TO SWING AND SLIDING OF CAMERA

METHOD AND APPARATUS FOR DETECTING MOVING OBJECT

BACKGROUND OF THE INVENTION

1. Field of the Invention

The present invention relates to an automatic monitoring system, and more particularly to a method of and an apparatus for detecting a moving object utilizing a technology of extracting from a motion image a moving area where a movement (of the object) has occurred.

2. Description of Related Art

Nowadays, security systems, which each automatically detect entering/leaving of vehicles into and from a facility, such as a parking lot, using a video camera, have been the individual facilities. In this conventional method, motion image data of a moving object is extracted from the individual scenes obtained from data of a motion image taken by a video camera. As this extraction method, a background subtraction method is currently known.

In the background subtraction method, a moving object is detected by comparing a motion image (input image) with a background image of the background. FIG. 24 of the accompanying drawings illustrates the background subtraction method using an input image 203a, a background image 203b, and a background difference image 203c. The background image 203b is subtracted from the input image 203a, which is a composite image composed of a moving object 204 and the background image 203b, to obtain the background difference image 203c.

Specifically, a difference, between brightness values of the input image 203a and previously recorded brightness values of the background image 203b located at the same position as the input image 203a, is calculated. If the calculated difference is equal to or higher than a particular threshold, it is judged that a change in brightness value has occurred due to appearance of a moving object 204. Thus the moving object 204 is detected.

The term "brightness value" is a value representing a degree of fullness of light and shining per pixel in an image. The term "pixel" is a minute area on the display screen which area corresponds to a resolution of the image. Additionally, in the following description, the brightness value will also be called simply "brightness"; the object which moves, "moving object"; the motion image, "image".

The background subtraction method has a problem in that mis-detection would tend to occur due to an environmental change, such as a change in weather, turning on and off the light or changeover of illumination. FIGS. 25(a) through 25(c) are graphs illustrating the manner in which a mis-detection occurs due to an environmental change according to the background subtraction method. In the individual graph, the horizontal axis represents positions on the screen, and the vertical axis represents brightness values in these positions. In FIG. 25(a), two brightness distribution curves 205a, 205b are shown. The brightness distribution curve 205a is a string of brightness values of the original image (screen), while the brightness distribution curve 205b is a modified form which the brightness distribution curve 205a has been modified because light has been turned on.

As the brightness distribution curve 205a of FIG. 25(b) is subtracted from the brightness distribution curve 205b of FIG. 25(a), it produces a brightness distribution curve 205c corresponding to the difference in brightness value between the input image and the background image so that an environmental change would be mis-detected as a moving object.

Consequently, in order to avoid mis-detection due to an environmental change, a brightness distribution shape comparison method is used. In this comparison method, appearance/absence of an object is detected by dividing the image into a plurality of blocks, each composed of a number of pixels, and measuring a difference in shape of brightness distribution in each block. In the following description, the individual block is called "unit block" or "sub-area". This comparison method will now be described more specifically with reference to FIGS. 26(a), 26(b), 27(a) and 27(b).

FIGS. 26(a) and 26(b) illustrate a change of brightness occurs due to an environmental change. The input image 203a of FIG. 26(a) is a monitoring region composed of two areas A, B. The area A represents an area shaded from sunlight, and the area B represents an area bright with sunlight.

The change of brightness due to environmental change is not uniform in the monitoring region (corresponding to the input image 203a). For example, in each of the areas A, B, the change of brightness is not uniform. In a limited local area, this change of brightness can be regarded as being uniform. For example, the brightness change in a limited local area indicated by a white circle in the area B in FIG. 26(a) is as shown in FIG. 26(b). Two brightness distribution curves 205d, 205e of FIG. 26(b) represent respective brightness changes in the circled local area of the area B. The brightness distribution curve 205d represents a brightness distribution when the circled local area is bright with sunlight, and the brightness distribution curve 205e represents a brightness distribution when the circled local area is shaded from sunlight.

On the other hand, FIGS. 27(a) and 27(b) illustrate a brightness change around a moving object. The input image 203a of FIG. 27(a) has a moving object 204. The brightness distribution in a ridge 210 of the moving object 204 is different in shape from the brightness distribution of the background image as shown in FIG. 27(b).

Therefore, by dividing the monitoring region into small unit blocks and obtaining a difference in shape of distribution of brightness values in the unit blocks between the input image and the background image, it is possible to detect appearance/absence of an object in terms of the individual unit blocks, irrespective of environmental changes.

This method is exemplified by "MOVING OBJECT DETECTION BY TIME-CORRECTION-BASED BACKGROUND JUDGEMENT METHOD" by Nagaya, et al., The Institute of Electronics, Information and Communication Engineers Theses Review (D-II), Vol.J79-D-II, No.4, pp. 568–576, 1996 (hereinafter called Publication 1), and "A ROBUST BACKGROUND SUBTRACTION METHOD FOR NON-STATIONARY SCENES" by Habe, et al., Meeting on Image Recognition and Understanding, MIRU '98 (hereinafter called Publication 2).

In a technology disclosed in Publication 1, brightness values in blocks are regarded as vector factors, and a normalized inter-vector distance of the input image is compared with that of the background image.

And in a technology disclosed in Publication 2, a variance in inter-block local distance of the input image is compared with that of the background image. In the following description, the term "enter" means that an object have entered into a monitoring region, and the term "leave" means that an object leaves from a monitoring region.

Japanese Patent Laid-Open Publication No. HEI 9-81753 (hereinafter called Publication 3) discloses a moving object extracting apparatus which can correctly identify a moving object even when a split of a moving area occurs in the same moving object because there is no adequate difference in brightness and tint between the input image and the background image. In Publication 3, when an object has concealed by another object, the concealing is detected, and then immediately after settlement of the concealing, the settlement is recognized to specify a settlement time, whereupon a shaped part of the intended object is trimmed from the detected moving area to extract a correct partial image of the intended object.

Japanese Patent Laid-Open Publication No. HEI 5-174261 (hereinafter called Publication 4) discloses another moving object detecting apparatus which prevents mis-detection due to occurrence of shading by a moving object detector and due to change in illumination, based on a difference image.

Japanese Patent Laid-Open Publication No. HEI 8-249471 (hereinafter called Publication 5) discloses still another motion image processing apparatus which detects, evaluates and judges a characteristic amount of a moving object to realize a follow-up survey including a stop-status of the moving object despite using an inter-frame difference process. And if parameters determined by given environmental conditions are inadequate, they are soon substituted by optimal parameters to realize precise detection.

Japanese Patent Laid-Open Publication No. HEI 8-167022 (hereinafter called Publication 6) discloses an image monitoring apparatus which enable sure follow-up survey and detection of a moving object at an improved processing rate.

Japanese Patent Laid-Open Publication No. HEI 8-106534 (hereinafter called Publication 7) discloses another object moving detecting apparatus which detects a moving object in a monitoring area with accuracy and recognizes the detected moving object.

However, in the object detecting methods described in Publications 1 and 2, detection of an object is made chiefly by detecting a ridge of the object. Therefore, when an object flat in shape of brightness distribution enters an area whose shape of brightness distribution of background is flat, it is impossible to detect a movement of the object from inside of the area where the moving object appears. This will be described more specifically using FIGS. 28(a), 28(b), 29(a), 29(b), 30(a) and 30(b).

FIG. 28(a) schematically shows an input image in which no object appears; the shape of a brightness distribution curve 211 is flat. And FIG. 28(b) schematically shows an input image in which an object appears; the object is a vehicle, for example, and the input image has areas 200a, 200b, 200d. In the areas 200a, 200d, since change in brightness distribution shape is large as compared to the brightness distribution curve 211 of FIG. 28(a), a movement of the object can be extracted.

In the meantime, in the area 200b which occupies an inner portion of the object-appearing area partly since the shape of the area 200b is analogous to the flat shape of the brightness distribution curve 211 of FIG. 28(a), a movement of the object cannot be detected. Since the real size of the object is not always proportional to the number of moving blocks to be detected, the following problems would occur.

FIG. 29(a) schematically shows an input image in which a single large-sized object, such as a vehicle, has entered. In FIG. 29(a), a brightness distribution curve of the object is flat in its central portion.

FIG. 29(b) is a top plan view showing a monitoring area in which a single large-sized object has entered. The monitoring area 23 is an area extracted from an input motion image. Small rectangles (quadrilateral) designated by 21 are areas, called moving blocks, whose brightness distribution changes have been detected by comparison in terms of unit blocks.

FIG. 30(a) schematically shows an input image in which two small-sized objects, such as two persons, have entered. And FIG. 30(b) is a top plan view showing a monitoring area 23 in which two small-sized objects have entered. In FIG. 30(b), object ridges are many for the size of the moving objects, which is smaller than the example of FIG. 29(b). Since the nearly same number of moving blocks 21 as in the example of FIG. 29(b) would occur, discrimination cannot be made between these two examples.

FIG. 31 is an arrangement diagram of unit blocks and a ridge of an object. In FIG. 31, the ridge 201 of the object extends along an end of rectangular area of the individual unit block 20. Therefore, the change of brightness distribution in the unit block 20 would be so small to detect the object.

FIG. 32 schematically shows an input image when a camera (not shown) has encountered swing or vibration; for example, the camera is fixedly mounted in the open air. Even though the image 202a of FIG. 32 was taken at a normal position, the image of the object would be deviated as the camera angle varied, resulting in an image 202b and hence mis-detection.

Publications 3 through 7 are totally silent about either a technology of detecting two kinds of objects as discriminated or a technology of preventing mis-detection due to swing or vibration of the camera.

SUMMARY OF THE INVENTION

With the foregoing problems in view, it is an object of the present invention to prove a moving object detecting method, in a technology of automatically extracting a movement of an object by detecting a moving area from an input image taken by a monitor camera, in which method a movement of an object can be detected irrespective of the shape of the object even in a varying environment where, for example, illumination varies, in which method a movement of an object can be detected irrespective of the positional relation between a ridge of the object and a border of unit blocks, and in which method only a moving object can be stably detected even when an environmental change, such as swing or vibration of a camera, happened to occur.

Another object of the invention is to provide an apparatus for carrying out the above-mentioned moving object detecting method.

In order to attain the first object, according to a first species of the present invention, there is provided a method of detecting a moving object, comprising: a first dividing step of dividing an input image into a plurality of first unit blocks; a second dividing step of dividing a given background image into a plurality of second unit blocks; a moving block extracting step of comparing the first unit blocks with the second unit blocks for every unit block and extracting a number of the first unit blocks, which are different in brightness distribution pattern from the corresponding second unit blocks, as moving blocks; a moving area setting step of setting a moving area that surrounds the moving blocks extracted in the moving block extracting step; and a brightness comparing step of comparing a distribution of brightness values of the input image with a distribution of brightness values of the background image in the moving area, which is set by the moving area setting step, to discriminate whether or not a moving object appears in the input image.

By the method of the first species, it is possible to facilitate making a discrimination between a single large-sized object and plural small-sized objects in a varying environment where, for example, light is turned on and off or illumination is varied, realizing a precise judgment on the area and position of an object.

As a preferable feature, the brightness comparing step may include: an appearance frequency measuring step of measuring a frequency of occurrence of pixels having a predetermined value; and a trimming step of trimming the pixels, whose appearance frequencies are lower than the predetermined value, from the pixels of the input image in the whole range of various brightness values.

As another preferable feature, in each of the first dividing step and the second dividing step, the individual first unit block may overlap neighboring unit blocks disposed adjacent to the last-named first unit block. As still another preferable feature, in the moving area setting step, the moving area surrounding the moving blocks may be rectangular in shape.

With these preferable features, it is possible to judge appearance/absence of an object based on the size of the object, realizing a precise detecting of a moving object.

According to a second species of the invention, there is provided a method of detecting a moving object, comprising: a monitoring region clipping step of clipping a monitoring region, which is to be monitored, from an input image; a region dividing step of dividing the monitoring region, which is clipped in the monitoring region clipping step, into a plurality of zones; a variance calculating step of calculating a variance of brightness values for each and every one of the plural zones obtained in the region dividing step; and an appearance detecting step of discriminating whether or not a moving object appears in the input image based on the variance calculated in the variance calculating step.

By the method of the second species, since variances are calculated, only a moving object can be stably detected even in a varying environment where a camera is mounted outdoors and encounters change of illumination and swing or vibration.

As a preferable feature, the appearance detecting step may include: a history information creating step of creating history information about the variance calculated for every one of the plural zones obtained in the region dividing step; and a variance comparing step of comparing the past variance before a current time based on the history information created in the history information creating step with the current variance in the current time based on the input image to discriminate whether an moving object appears in the input image. As another preferable feature, in the appearance detecting step, if the number of the zones whose variance is equal to or higher than a first threshold is equal to or larger than a predetermined value, the appearance of the moving object is notified, and otherwise if the number of the zones whose variance is equal to or lower than a second threshold is equal to or larger than a predetermined value, the absence of the moving object is notified. As still another preferable feature, in the appearance detecting step, if the number of the zones whose increase value of variance is equal to or higher than a third threshold is equal to or larger than a predetermined value, the appearance of the moving object is notified, and if the number of the zones whose decrease value of variance is equal to or higher than a fourth threshold is equal to or larger than a predetermined value, the absence of the moving object is notified.

As a further preferable feature, in the appearance detecting step, a reference value, based on which the increase value of variance and the decrease value of variance are to be calculated, is created from average values of the past variances before the current time. As a still further preferable feature, in the appearance detecting step, if the variance from which entering of the moving object is to be detected is equal to or higher than a first threshold, the appearance of the moving object is notified, and if the decrease value of variance from which leaving of the moving object is to be detected is equal to or larger than a fourth threshold, the absence of the moving object is notified. As another preferable feature, in the appearance detecting step, if an increase value of variance from which entering of the moving object is to be detected is equal to or higher than a third threshold, the appearance of the moving object is notified, and if the variance from which leaving of the moving object is to be detected is equal to or lower than a second threshold, the absence of the moving object is notified.

As an additional preferable feature, in the appearance detecting step, the monitoring region is set by expanding an assumed area of the moving object.

With these preferable features, since no background difference is utilized so that a possible swing of the camera is not influential on variances, it is possible to detect an object precisely even when the came is swung or vibrated.

According to a third species, there is provided a method of detecting a moving object in an input image, comprising: a monitoring region clipping step of clipping a monitoring region, which is to be monitored, from the input image; a first region dividing step of dividing the monitoring region, which is clipped in the monitoring region clipping step, into a plurality of zones in a direction perpendicular to a direction in which the moving object enters; a variance calculating step of calculating a variance of brightness values for each and every one of the plural zones obtained in the first region dividing step; a zone discriminating step of discriminating whether an individual one of the plural zones is an object-appearing zone in which the moving object appears or an object-free zone in which the moving object is absent, by comparing the variance obtained in the variance calculating step with a predetermined value; and a moving-direction recognizing step of recognizing a direction in which the moving object moves, based on a direction of occurrence of the object-appearing zone found as the result of discrimination in the zone discriminating step.

As a preferable feature, the zone discriminating step uses a first discriminating way such that if the variance is equal to or larger than the predetermined value, the plural zones are judged as the object-appearing zones, and if the variance is smaller than the predetermined value, the plural zones are judged as the object-free zones. As another preferable feature, the zone discriminating step uses a second discriminating way such that if the amount of change in the variance is equal to or larger than a predetermined value, the plural zones are judged as the object-appearing zones, and if the amount of change in the variance is equal to or smaller than the predetermined value, the plural zones are judged as the object-free zones. As still another preferable feature, in the zone discriminating step, the predetermined value is created from an average value of the past variance of brightness values before the current time.

As an additional preferable feature, in the moving-direction recognizing step, the direction of moving of the moving object is recognized using one of the first and second recognizing ways.

With these preferable features, since no background difference is utilized so that a possible swing of the camera is not influential on variances, it is possible to detect an object precisely even when the came is swung or vibrated.

In order to attain the second object, according to a fourth species of the present invention, there is provided an apparatus for detecting a moving object in an input image, comprising: an input image retaining section for retaining the input image; a background image retaining section, connected to the input image retaining section, for retaining a given background image; a background difference calculating section, connected to the input image retaining section and the background image retaining section, for calculating a difference between the input image and the background image; a moving direction recognizing section, connected to the input image retaining section, for dividing data of the input image into a plurality of pieces of data one piece for each of a plurality of zones and evaluating the data; and a united judging section, connected to the background difference calculating section and the moving direction recognizing section, for judging the appearance of the moving object and the direction of moving of the moving object.

With the apparatus of the fourth species, it is possible to detect the position and area of an object in an input motion image precisely without bearing the influence due to a swing or vibration of a camera.

As a preferable feature, the background difference calculating section includes: a block-background difference calculating unit, connected to the input image retaining section and the background image retaining section, for comparing first unit blocks related to the input image with second unit blocks related to the background image to extract a moving block in which a change occurs in brightness distribution pattern; and an in-moving-area background difference calculating unit, connected to the block-background difference calculating unit, for setting a moving area surrounding the extracted moving block and comparing the distribution pattern of brightness values of the input image and the distribution pattern of brightness values of the background image to discriminate whether the moving object appears in the input image.

As an additional preferable feature, the moving direction recognizing section includes: a zone information retaining unit for retaining and outputting zone division information related to division of the input image into the plural zones; a variance calculating unit, connected to the zone information retaining unit and the input image retaining section, for dividing data of the input image, which is retained in the input image retaining section, into the plural pieces of data one piece for each the plural zones in accordance with the zone division information output from the zone information retaining unit, and for calculating variance of brightness values for every one of the plural zones; a variance history managing unit for retaining and outputting history information related to the past variance before the current time and calculated for each and every one of the plural zones; and a variance evaluating unit, connected to the variance calculating unit and the variance history managing unit, for evaluating the variance calculated by the variance calculating unit and the history information output from the variance history managing unit.

With the apparatus of the fourth species, it is possible to realize high-resolution detection and also precise detection even when the camera is swung or vibrated.

BRIEF DESCRIPTION OF THE DRAWINGS

FIG. 3 is an arrangement diagram of overlapping blocks and a ridge of an object;

FIG. 4(a) is a diagram showing an input image into which a single large-sized object has entered;

FIG. 4(b) is a diagram showing a monitoring region into which the single large-sized object has entered;

FIG. 5(a) is a diagram showing an input image into which a single small-sized object has entered;

FIG. 5(b) is a diagram showing a monitoring region into which the single small-sized object has entered;

FIG. 7(a) is a graph showing a brightness distribution of a background image;

FIG. 7(b) is a graph showing a brightness distribution of an input image into which two large-sized objects have entered;

FIG. 8(a) is a graph showing a brightness distribution of an input image into which two small-sized objects have entered;

FIG. 8(b) is a histogram of brightness values of an input image into which the two small-sized objects have entered;

FIG. 8(c) is a graph showing a brightness distribution of the processed input image;

FIGS. 14(a) and 14(b) are graphs each illustrating the method in which a variance is calculated for every zone;

FIG. 15 is a graph illustrating the method in which a threshold is determined when an object goes out of a zone;

FIGS. 27(a) and 27(b) are a view and a graph respectively illustrating a change in brightness at the periphery of a moving object;

FIG. 28(a) is a diagram showing an input image in which no object appears;

FIG. 28(b) is a diagram showing an input image in which an object appears;

FIG. 29(a) is a diagram showing an input image into which a single large-sized object has entered;

FIG. 29(b) is a diagram, as viewed from top, showing a monitoring region into which the large-sized object has entered;

FIG. 30(a) is a diagram showing an input image into which two small-sized objects have entered;

FIG. 30(b) is a diagram, as viewed from top, showing a monitoring region into which the two small-sized objects have entered;

DESCRIPTION OF THE PREFERRED EMBODIMENTS

Preferred embodiments of the present invention will now be described with reference to the accompanying drawings.

Figure 1:
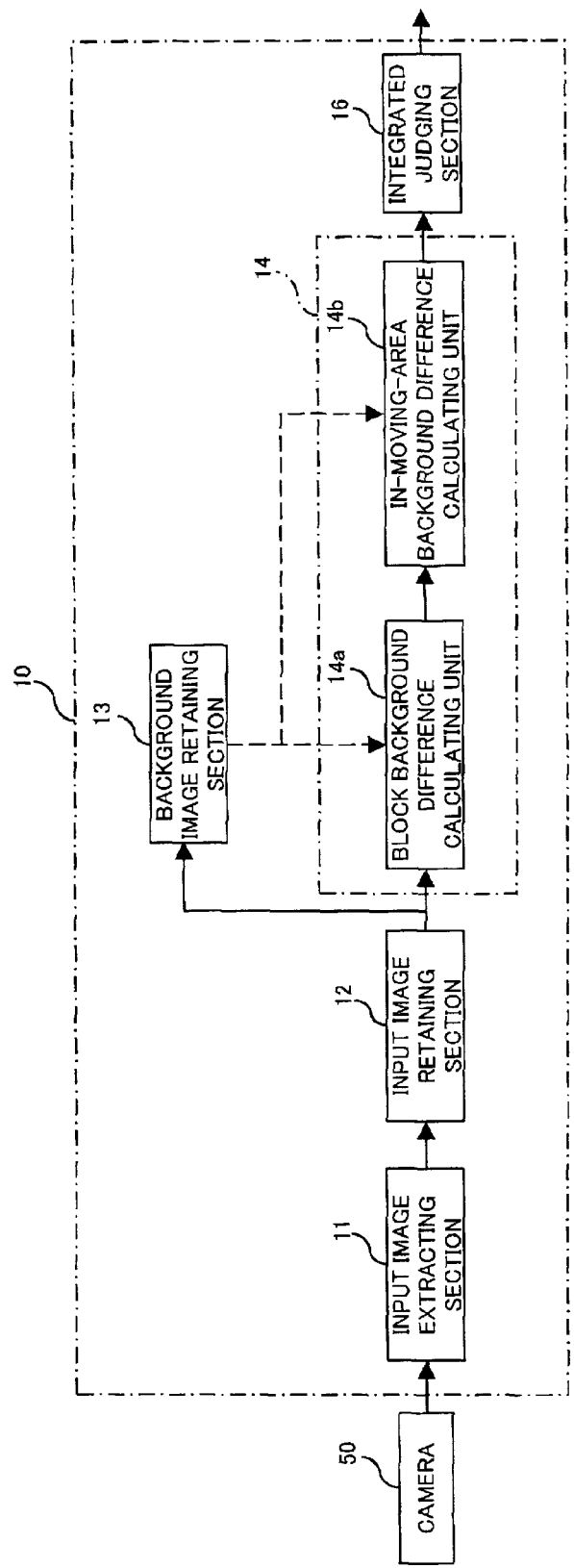
FIG. 1 is a block diagram of a moving object detecting apparatus according to a first embodiment of the present invention.

(A) First Embodiment:

FIG. 1 is a block diagram showing a moving object detecting apparatus according to a first embodiment of the present invention. The moving object detecting apparatus 10 of FIG. 1 detects a moving area, in which a movement has occurred, from input digital motion image data and automatically extracts a movement of an object from an input image. For this purpose, the moving object detecting apparatus 10 comprises an input image extracting section 11, an input image retaining section 12, a background image retaining section 13, a background difference calculating section 14, and an integrated judging section 16.

In FIG. 1, a camera 50 is a monitoring camera, mounted in, for example, a parking lot, for taking a motion picture of a vehicle entering into or going out of the parting lot. The individual motion picture (input image) taken by the camera 50 is converted into digital data, and the digital data is input to the moving object detecting apparatus 10. A solid-line arrow indicates a flow of data, and a dotted-line arrow indicates both a flow of data and the direction of referring the data.

The input image extracting section 11 of FIG. 1 extracts a monitoring region (to be monitored) from a motion image taken by the camera 50 and outputs the extracted monitoring region to the input image retaining section 12 as an input image for retaining. The background image retaining section 13 is connected to the input image retaining section 12 to retaining a background image.

Further, the background difference calculating section 14 is connected to both the input image retaining section 12 and the background image retaining section 13 for calculating a difference between the input image and the background image. For this purpose, the background difference calculating section 14 includes a block background difference calculating unit 14a, and an in-moving-area background difference calculating unit 14b.

The block background difference calculating section 14a is connected to the input image retaining section 12 and the background image retaining section 13 for comparing an input-image-related unit block 20 and a background-image-related unit block 20 to extract a moving block 21 in which a change in shape of brightness distribution. The position information of each of an input-image-related moving block and a background-image-related moving block is represented by x- and y-coordinates of the individual moving block.

Necessary terms will now be described with reference to FIG. 4(b) showing a monitoring region into which a single large-sized object has entered; a half-toned portion represents the moving object. The monitoring region 23 of FIG. 4(b) is a portion clipped off a motion image. A number of moving blocks 21 each represent a unit block in which an evidence of appearance of the object has been extracted; 12 moving blocks 21 have been detected in FIG. 4(b). And a moving area 22 represents the area surrounding these moving blocks 21.

The block background difference calculating unit 14a (FIG. 1) makes a comparison in shape of brightness distribution between the input image and the background image for plural pixels of their corresponding unit blocks 20 at the same point. This comparison method is exemplified by the following two:

The first one is a method of calculating a vector angle between two vectors, which are brightness values of plural pixels of two unit blocks 20, and then recognizing the occurrence of a movement when the calculated vector angle becomes equal to or larger than a predetermined value. The vector angle can be obtained by an inner product.

The second one is a method of normalizing two vectors, which are brightness values of plural pixels of two unit blocks 20, then measuring a distance between these two vectors, and recognizing the occurrence of a movement when the measured distance is equal to or larger than a predetermined value.

The comparison method should by no means be limited to these two examples and various other methods may be suggested.

Figure 2:
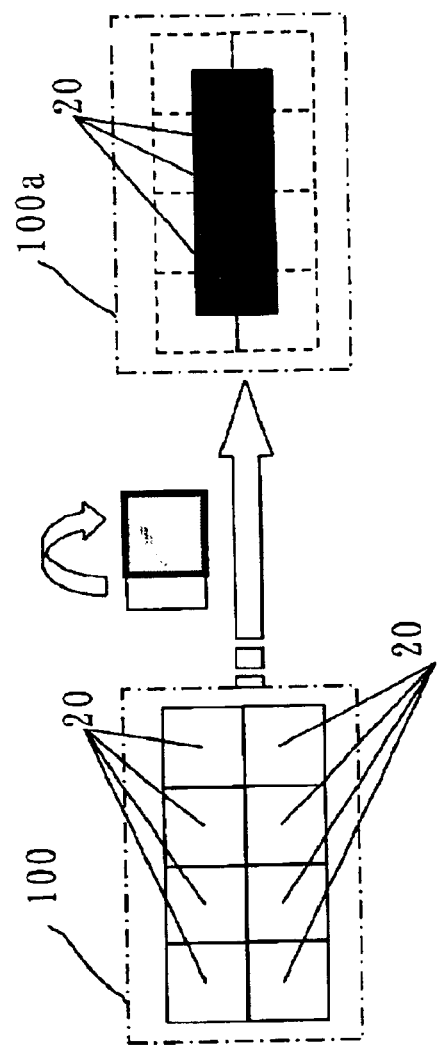
FIG. 2 is a concept diagram illustrating how to arrange blocks by shifting.

Detection of an object by the block background difference calculating section 14a is carried out with respect to unit blocks 20 overlapping one another. FIG. 2 is a concept diagram illustrating how to arrange blocks by shifting. As shown in FIG. 2, in a region 100, eight (for example) unit blocks 20 are arranged in a pattern devoid of overlapping, while in a region 100a, the unit blocks 20 are arranged in a different pattern from that in the region 100. Namely, in the region 100a, some unit blocks 200 are overlapping adjacent unit blocks 20.

FIG. 3 is an arrangement diagram of overlapping blocks and a ridge of an object; elements or parts similar to those shown in FIG. 2 are designated by the same reference numbers. In the region 100a of FIG. 3, a ridge 101a extends centrally through a rectangular area of the individual unit block 20. It is therefore possible to precisely detect a change in brightness distribution in the unit blocks 20 and thus to precisely detect a movement of the object. It is also possible to capture a movement of the object, irrespective of the positional relation between borders of the unit blocks and a ridge of the object.

The in-moving-area background difference calculating section 14b (FIG. 1) is connected to the block background difference calculating section 14a for setting a moving area 22 surrounding an extracted moving block 21 and comparing a difference between distribution shape of brightness values of an input image and that of brightness values of a background image in the set moving area 22 to detect an object in the input image.

This comparison method also is exemplified by the two methods mentioned above in connection with the block background difference calculating section 14a; namely, judgment of appearance of an object may be made in terms of a vector angle of two vectors generated by pixels in the moving area 22 of both the input image and the background image or in terms of the distance between the vectors.

The integrated judging section 16 is connected to the background difference calculating section 14 for judging on appearance of an object and on direction of movement of the object.

The function of each of the input image retaining section 12 and the background image retaining section 13, among the foregoing sections of the moving object detecting apparatus, is realized by a memory such as RAM (random access memory). And the functions of the remaining sections are realized by software processing according to non-illustrated CPU (central processing unit) and non-illustrated memories.

FIG. 4(a) is a diagram showing an input image into which a single large-sized object has entered; a half-toned portion in FIG. 4(a) represents the large-sized object having entered, as viewed in elevation. Regions 100b, 100c respectively represents regions where a movement is to be detected.

The input image is divided into a plurality of unit blocks 20 (first unit blocks) (first dividing step), and the background image is divided into a plurality of unit blocks 20 (second unit blocks) (second dividing step). Then the first unit blocks 20 and the second unit blocks 20 are compared to extract the unit blocks 20, which are different in shape of brightness distribution, as "moving blocks 21" (moving block extracting step).

FIG. 4(b) is a diagram showing a monitoring region 23 in which a single large-sized object has entered and in which a plurality of moving blocks 21 have been extracted. Then a moving area 22 surrounding the extracted moving blocks 21 is set (moving area extracting step), and distribution of brightness values of an input image and that of brightness values of a background image are compared to detect an object in the set moving area 22 to discriminate whether or not a moving object appears in the input image (brightness comparing step).

FIG. 5(a) schematically shows a moving area in which two small-sized objects have entered, and FIG. 5(b) schematically shows a monitoring region 23 in which two small-sized objects have entered and in which a plurality of moving blocks 21 are arranged.

Subsequently, the difference of brightness distribution in the moving area 22 will now be described between when a single large-sized object enters and when two small-sized objects enter.

Figure 6:
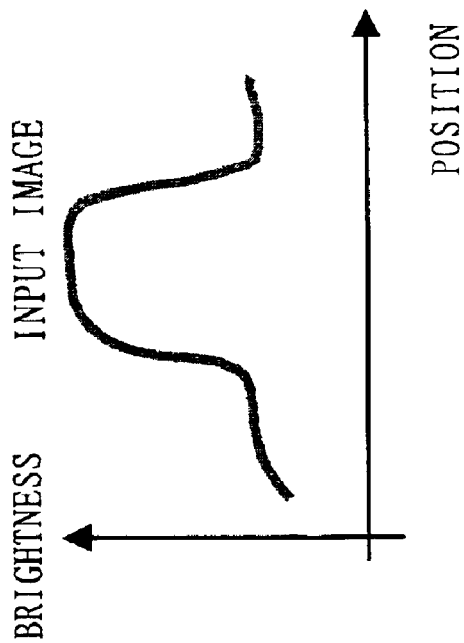
FIG. 6(a) is a graph showing a brightness distribution of a background image.
FIG. 6(b) is a graph showing a brightness distribution of an input image into which a single large-sized object has entered.
Figure 6:
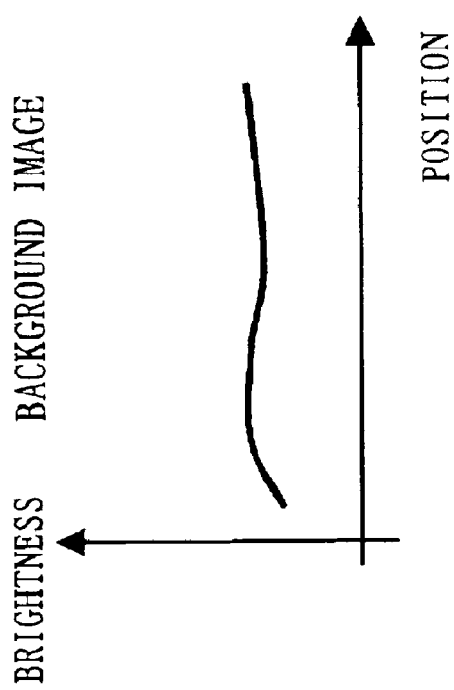

FIGS. 6(a) and 6(b) are graphs respectively showing a brightness distribution of a background image and that of an input image when a single large-sized object has entered in the moving area 22. The shape of brightness distribution of the input image of FIG. 6(b) is considerably different from that of brightness distribution of the background image of FIG. 6(a).

FIGS. 7(a) and 7(b) are graphs respectively showing a brightness distribution of a background image and that of brightness distribution of an input image when two small-sized objects have entered in the moving area 22. As shown in FIG. 7(b), the brightness distribution of the input image has two peaks one at each of two positions in which the two moving objects respectively appear, and is substantially identical in shape with that of the background image of FIG. 7(a) throughout the entire area except the peaks.

Thus, by making a comparison of brightness distribution in the moving area 22 between the background image and the input image, it is possible to discriminate whether what has entered is a single large-sized object or two small-sized objects.

The method of precisely detecting an object in the moving area 22 in terms of appearance frequency will now be described with reference to FIGS. 8(a) through 8(c).

FIG. 8(a) is a graph showing a brightness distribution of an input image when two small-sized objects have entered. This brightness distribution has two peaks respectively at two positions, and has substantially at C in brightness value at the other positions. The brightness values at the two peaks are far different from those at the other positions.

FIG. 8(b) is a histogram of brightness values of the input image when two small-sized objects have entered. In FIG. 8(b), the horizontal axis indicates the brightness value, and the vertical axis indicates the appearance frequency (occurrence frequency) meaning how often a pixel having a predetermined brightness value has appeared, the appearance frequency having a peak at a brightness value C. Namely, in detecting an object, the frequency of occurrence of pixel having a predetermined value in the moving area 22 is calculated (appearance frequency calculating step).

Then the pixels at opposite ends whose appearance frequency is lower than a predetermined value in brightness distribution of the input image are trimmed from the brightness histogram curve of FIG. 8(b). At that time, several percent part of the entire brightness histogram curve, e.g. the pixels in 5% range at each of upper and lower brightness values, is cut off. Thus the pixels, whose appearance frequency is lower than the predetermined value, from the pixels of the input image in the whole range of various brightness values (trimming step). FIG. 8(c) is a graph showing a brightness distribution of the input image after the trimming; a flat distribution shape similar to that of the background image is obtained as the peaks have been removed.

The trimmed distribution shape is similar to that of the background image (FIG. 7(a)); therefore, based on the difference in brightness distribution shape between the input image and the background image, it is possible to facilitate discriminating whether what has entered is a single large-sized object or two small-sized objects. Even if the brightness value at the peak is close to that of the other background portions, there is no great influence as the pixels to be removed are only several percent part of the whole.

Thus by comparing in shape of brightness distribution between the input image and the background is image, it is possible to facilitate discriminating whether what has entered is a single large-sized object or two small-sized objects, or to precisely detect an object.

With the foregoing construction, a moving object is detected in the following manner:

First of all, a motion image of a vehicle or a person entering a parking lot, for example, is taken by the camera 50 (FIG. 1). Then a monitoring region 23 of the motion image is clipped off by the input image extracting section 11 in the moving object detecting apparatus 10 and is retained in the input image retaining section 12 as an input image.

Then, assuming that the individual pixels in the unit block 20 are vector factors, the block background difference calculating section 14a measures a vector distance between the input image and the background image after subtracting an average value from each vector factor. When the vector distance is equal to or larger than a predetermined value, the block background difference calculating section 14a recognizes a change in brightness value and thus occurrence of a movement in the input image. Further, the block background difference calculating section 14a inputs information about this moving area 22 to the in-moving-area background difference calculating section 14b. If the moving area 22 is set as being rectangular, the x- and y-coordinates of each of plural moving blocks 21 are input to the in-moving-area background difference calculating section 14b as the movement is detected.

Subsequently, the in-moving-area background difference calculating section 14b specifies the moving area 22 by the x- and y-coordinates input from the block background difference calculating section 14a, and compares the input image and background image in this moving area 22. Then a histogram of brightness of the input image is created, and pixels of high brightness values and those of low brightness values are cut off by, for example, 5%, whereupon the resultant input image is compared in distribution shape with the background image. The result of this comparison is then input to the integrated judging section 16 where appearance of an object and an direction of movement of the object are judged in an integrated manner.

Thus, according to the first embodiment, it is possible to discriminate whether an object appears or not and to precisely detect a moving object.

It is also possible to realize a high-resolution detection with respect to the area and position of a moving object.

Further it is possible to facilitate discriminating whether what has entered is a single large-sized object or a plurality of small-sized objects, irrespective of the change of environment as illumination is on and off or degree of illumination is varied.

(B) Second Embodiment:

In the second embodiment, two detecting functions, i.e. detecting an object and detecting a direction of movement of the object, are realized by dividing a monitoring region into a plurality of zones and calculating variance for each and every zone. In the first embodiment, an object is detected by obtaining a difference between the input image and the background image. In the second embodiment, unlike the first embodiment, an object is detected by calculating variance of brightness values from the input image, and as an added function, a direction of movement of the object is detected. In the following description, the term "variance" will occasionally be used to mean "variance value".

Figure 9:
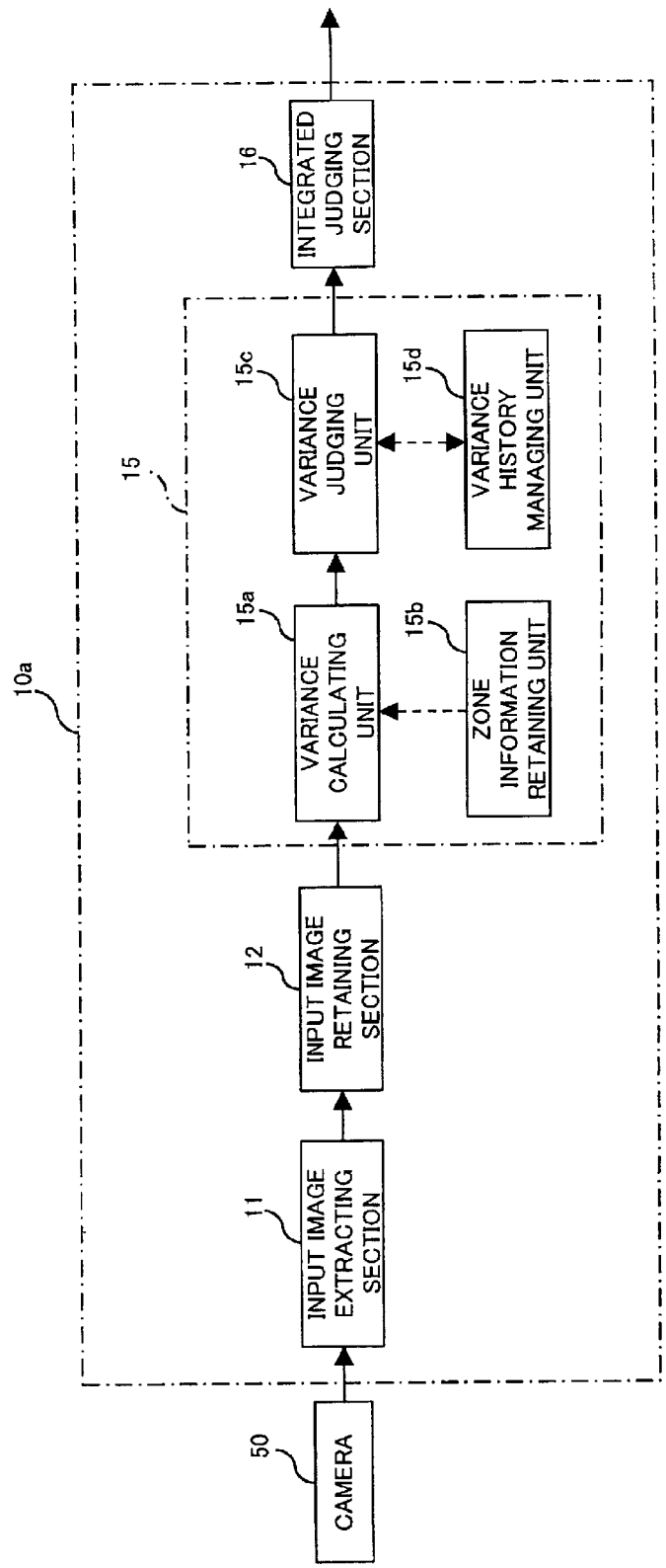
FIG. 9 is a block diagram showing a moving object detecting apparatus according to a second embodiment of the present invention.

FIG. 9 is a block diagram of a moving object detecting apparatus according to the second embodiment. The moving object detecting apparatus 10a of FIG. 9 detects a movement of an object by detecting, from input digital motion image data, an area where a movement has occurred. For this purpose, the moving object detecting apparatus 10a comprises an input image extracting section 11, an input image retaining section 12, a moving-direction recognizing section 15, and an integrated judging section 16. In FIG. 9, elements or parts similar to those described in connection with the first embodiment are designated by the same reference numbers, so a repetition of description is omitted here. Further, in FIG. 9, a solid-line arrow indicates a flow of data, and a dotted-line arrow indicates both a flow of data and the direction of referring the data.

The moving direction recognizing section 15 is connected to the input image retaining section 12 for dividing the input image data into a plurality of pieces of data one piece for each zone to detect an object in the input image and recognize a direction of movement of the object. For this purpose, the moving direction recognizing section 15 includes a zone information retaining unit 15b, a variance calculating unit 15a, a variance history managing unit 15d, and a variance judging unit 15c.

The zone information retaining unit 15b retains and outputs division information (hereinafter also called the zone division information) relating to division of the input image into a plurality of zones; this zone division information is determined by the size of an object to be detected and the direction of entering of the object. And the variance calculating unit 15a is connected to the zone information retaining unit 15b and the input image retaining section 12 for dividing the input image data, which is retained in the input image retaining section 12, into a plurality of pieces of data one piece for each zone based on the zone division information output from the zone information retaining unit 15b and calculating variance of brightness values for each and every zone.

The variance history managing unit 15d retains and outputs history information about past variance values for the individual zones; a value for the latest "no object" status is retained for the individual zone. This history information is information created based on the past variances calculated one for each zone.

The variance judging unit 15c is connected to the variance calculating unit 15a and the variance history managing unit 15d for detecting an object and determining the direction of movement of the object based on both the variance values calculated by the variance calculating unit 15a and the history information output from the variance history managing unit 15d. Further, in the variance judging unit 15c, a predetermined value (or threshold) is previously set or a value for the latest "no object" status is obtained from the variance history managing unit 15d. During detection of a movement of an object, the variance judging unit 15c refers to history information of the variance history managing unit 15d to detect a monotonic increase or decrease of the plural zones in which appearance of an object has been detected.

The integrated judging section 16 is connected to the moving direction recognizing section 15 for judging both the appearance of an object and the direction of movement of the object; this function is realized using software.

First of all, a monitoring region 23a is clipped from the input image (monitoring region clipping step), and the clipped monitoring region 23a is divided into a plurality of zones (dividing step), whereupon variance of brightness values is calculated for each zone (variance calculating step). Then, based on the obtained variance, it is detected whether or not an object appears in the input image (detecting step). The detection procedure for the individual steps will now be described.

Figure 10:
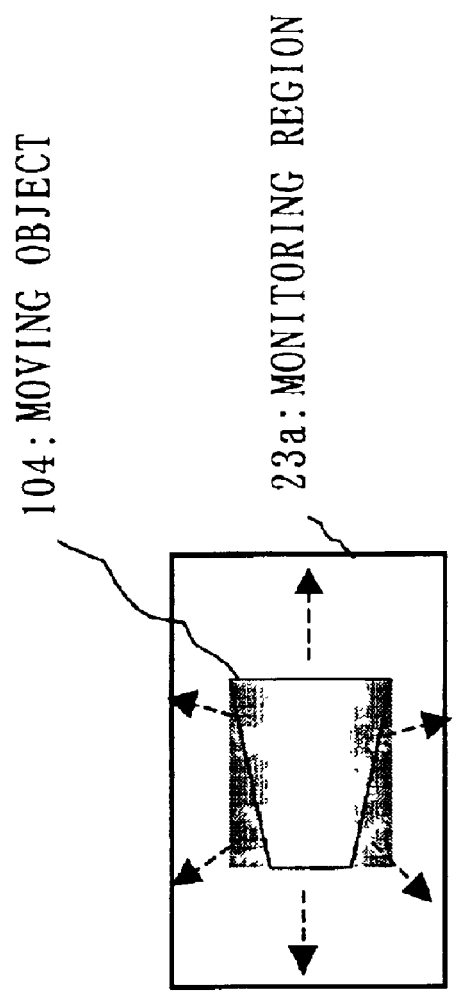
FIG. 10 is a diagram showing a monitoring region into which a moving object has entered.

Description starts off with clipping a monitoring region 23a. FIG. 10 schematically shows the monitoring region 23a. The monitoring region 23a of FIG. 10 is clipped from the input image so as to include both a moving object 104 and a background. The area of the monitoring region 23a is set to approximately double the area of the moving object 104 for the following reason.

Figure 11:
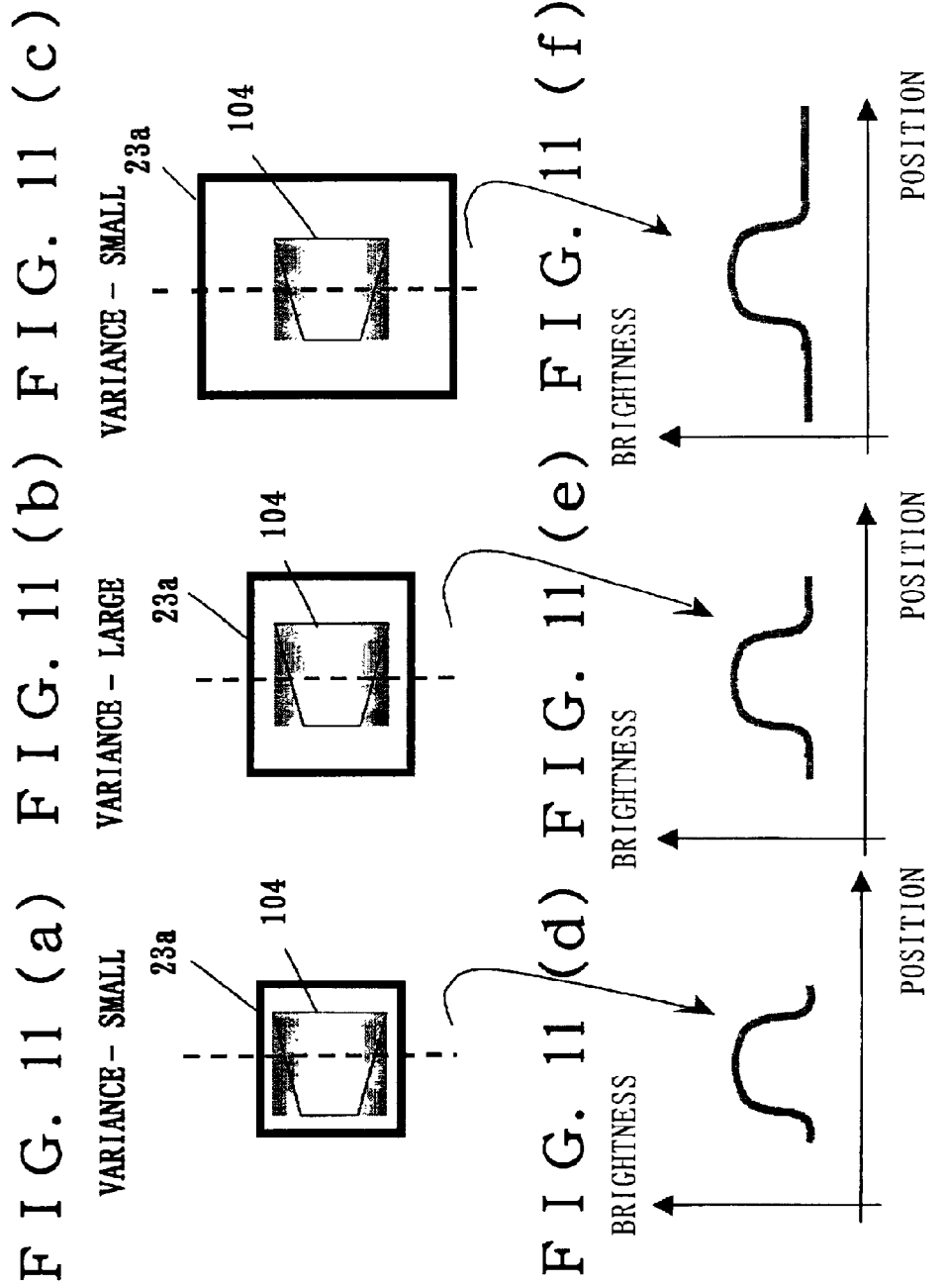
FIGS. 11(a) through 11(f) are diagram/graphs illustrating changes in variance values by area ratio.

FIGS. 11(a) through 11(f) illustrate changes of variances due to the area ratio. FIG. 11(b) schematically shows a monitoring region 23a whose area is double the area of the moving object 104; FIG. 11(a), a monitoring region 23a whose area is smaller than double the area of the moving object 104; FIG. 11(c), a monitoring region 23a whose area is larger than double the area of the moving object 104. FIG. 11(e) is a graph showing a brightness distribution of the monitoring region 23a whose area is double the area of the moving object 104; FIG. 11(d), a graph showing a brightness distribution of the monitoring region 23a whose area is smaller than double the area of the moving object 104; FIG. 11(f), a graph showing a brightness distribution of the monitoring region 23a whose area is larger than double the area of the moving object 104.

When the area of the monitoring region 23a is nearly double the area of the moving object 104, a maximal variance is obtained. In other words, as shown in FIG. 11(e), when the moving object 104 and a portion of the background image enter the monitoring area 23a individually by about 50% (area ratio is approximately 0.5), a variance is maximal.

Since detection of an object is carried out by the area ratio at which the maximum variance can be obtained, it is possible to improve the reliability. The value "2" representing the area ratio is adjusted and set to an optimum value in accordance with given guidelines for designing.

Then, the obtained monitoring region 23a is divided into a plurality of zones to generate history information about past variances calculated one for each of the plural zones (history information creating step).

Subsequently, detection of an object is carried out by comparing the past variances based on the history information with the current variances based on the input image (comparing step). The reason, why detection of an object is not carried out in terms of brightness in the monitoring region 23 (FIG. 4) like the first embodiment, will now be described with reference to FIGS. 12(a) through 12(d).

Figure 12:
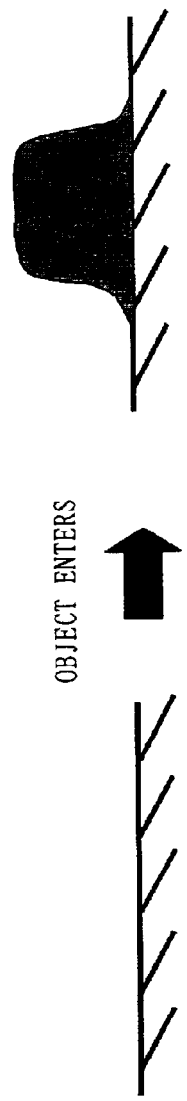
FIG. 12(a) is a diagram showing an input image in which no object appears.
FIG. 12(b) is a diagram showing an input image into which an object has entered.
FIG. 12(c) is a graph showing a frequency of occurrence of brightness values of pixels when no object appears in an input image.
FIG. 12(d) is a graph showing a frequency of occurrence of brightness values of pixels when an object has entered into the input image.
Figure 12:
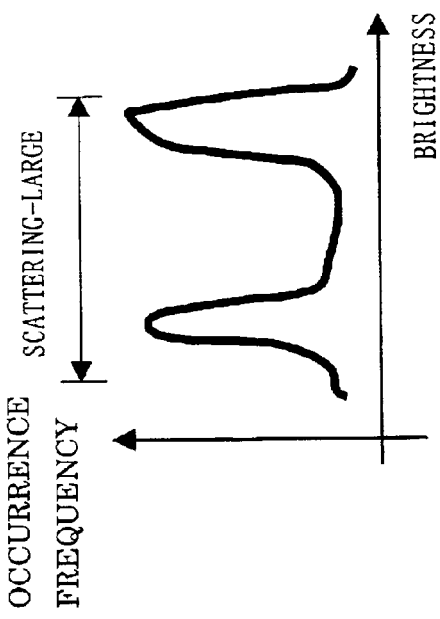
Figure 12:
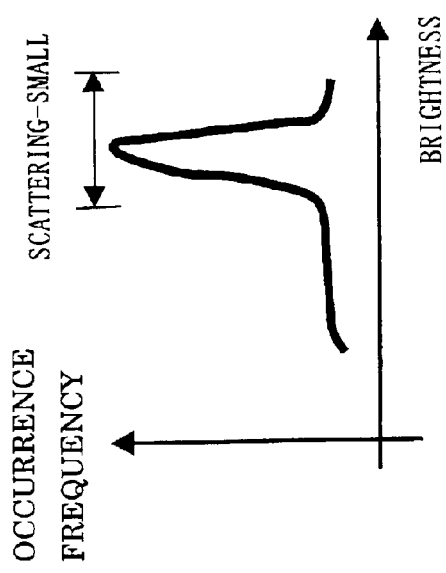

FIG. 12(a) schematically shows an input image in which no object appears; and FIG. 12(b), an input image in which an object has entered. FIG. 12(c) is a graph showing a frequency of occurrence of a brightness in the pixels when an object has entered; and FIG. 12(d), a graph showing a frequency appearance of a brightness in pixels when an object has entered. The horizontal axis of FIGS. 12(c) and 12(d) represents the brightness value (brightness), while the vertical axis represents the appearance frequency (occurrence frequency); this is, the individual graph illustrates how often a predetermined brightness value has appeared.

Since the brightness of the input image of FIG. 12(a) is uniform, the brightness histogram of FIG. 12(c) has only a single peak. And the input image of FIG. 12(b) has a brightness histogram of FIG. 12(d) with two peaks respectively corresponding to the background image and the object image. Namely, the brightness histogram of FIG. 12(c) is small in variance of brightness values, while the brightness histogram of FIG. 12(d) is large in variance of brightness values.

As a result, a large difference in variance of brightness values in the monitoring region 23 occurs between before and after an object has entered in the monitoring region 23. Therefore, by calculating these variances of brightness values, it is possible to detect a movement of the object.

According to this method, since it is unnecessary to obtain the difference between the input image and the background image, detection would hardly encounter an error due to vibration of the camera 50. Since variance of brightness values would scarcely vary due to the change in luminosity of the circumference, it is possible to improve the resistance to change of environment, realizing a less-occurrence-of-error detection.

However, since this change in variance bears influence of not only the size of a moving object but its brightness value, a small-sized object and a large-sized object would occasionally cause the same variance.

Figure 13:
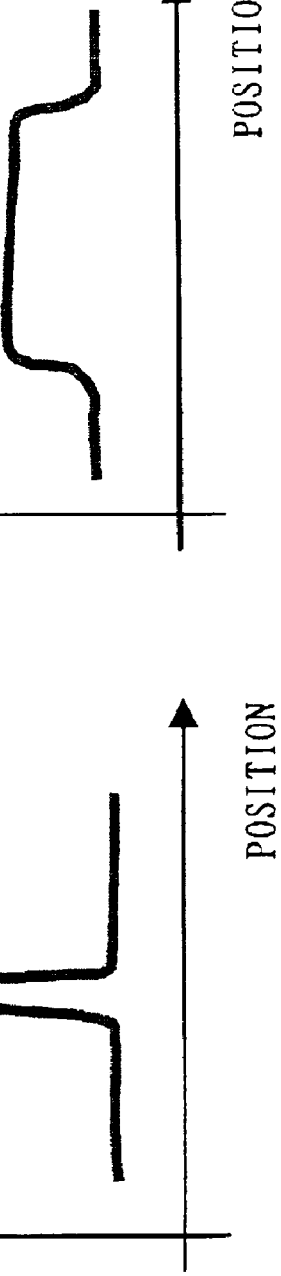
FIGS. 13(a) and 13(b) are graphs respectively showing brightness distributions of two kinds of objects.

FIGS. 13(a) and 13(b) are graphs respectively showing brightness distributions of two kinds of objects. Specifically, the brightness distribution of FIG. 13(a) indicates "a small-area object whose brightness value is far remote from that of the background image", while the brightness distribution of FIG. 13(b) indicates "a large-area object whose brightness value is close to that of the background image". The brightness distributions of FIGS. 13(a) and 13(b) are different in shape from each other, but are close in variance to each other.

It is therefore impossible to discriminate these two kinds of objects one from the other by only variance. Consequently, the brightness distribution is divided into a plurality of zones in order to calculate variances.

FIGS. 14(a) and 14(b) respectively illustrate how to calculate variances for every zone. For example, the brightness distribution of each of FIGS. 14(a) and 14(b) is divided into six zones (indicated by 1 through 6).

Specifically, for the brightness distribution of FIG. 14(a), variance is calculated for every zone; as a result, no change is detected in any of the zones 1–3, 5, 6, while a change is detected in the zone 4. For the brightness distribution of FIG. 14(b), as the result of calculation of variances, no change is detected in either of the zones 1, 6, while a change is detected in each of the zones 2–5. Namely, the zones where the variance varies are few in FIG. 14(a), while those where the variance varies are many in FIG. 14(b).

Thus, by diving the brightness distribution into zones, it is possible to make a discrimination between "a small-area object whose brightness value is far remote from that of the background" and "a large-area object whose brightness value is close to that of the background".

This detection is exemplified by two methods. According to the first method, appearance of an object is notified when the number of zones, whose variance is equal to or higher than a first threshold, is equal to or larger than a predetermined value, and absence of any object is notified when the number of zones, whose variance is equal to or lower than a second threshold, is equal to or larger than the predetermined value.

FIG. 15 is a graph showing how to determine a threshold when an object leaves from the zone; this variance curve varies in brightness value with time.

According to the second method, appearance of an object is notified when the number of zones, whose increase of variance is equal to or higher than a third threshold, is equal to or larger than a predetermined value, and absence of any object is notified when the number of zones, whose decrease of variance is equal to or higher than a fourth threshold, is equal to or larger than a predetermined value. Assuming that an object has entered into the monitoring region 23*a*, the extent of variation of variance depends on the shape of brightness distribution caused by a moving object; therefore an observer cannot estimate a variance. For this reason, according to the first method, it is difficult to set the first threshold; consequently, evaluation is made in terms of a relative value from the current variance when detecting that an object has entered into the monitoring region 23*a*.

Figure 16:
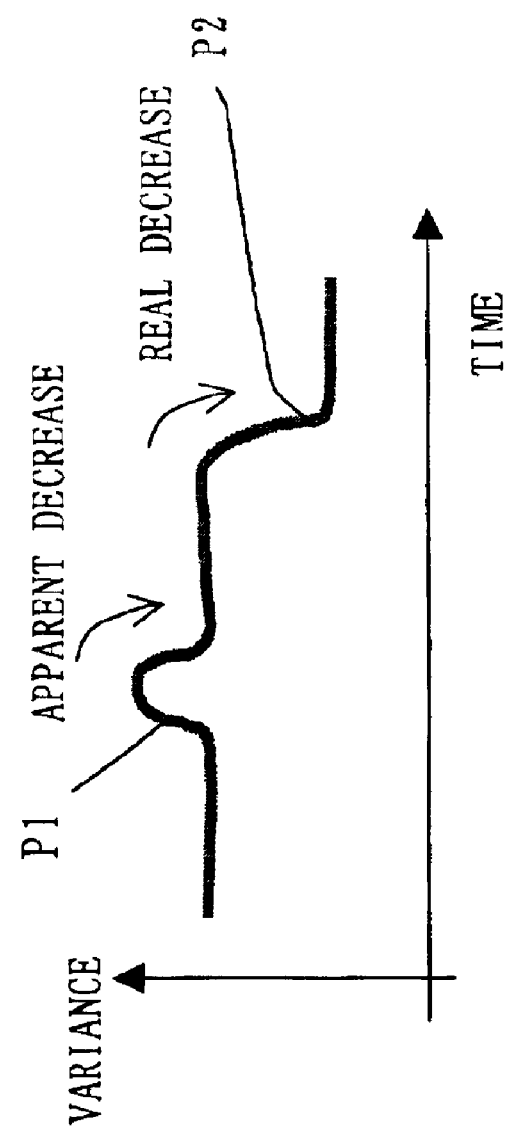
FIG. 16 is a graph illustrating the manner in which an error detection is prevented according to the second embodiment.

FIG. 16 is a graph illustrating how to prevent a misdetection in the second method. In FIG. 16, when variation of variance from a reference value is detected, a misdetection occasionally occurs due to a temporary change of variance. Assuming that leaving of an object from the monitoring region 23*a* is monitored, variance occasionally increases at a position, indicated by P1 in FIG. 16, as the object moves across the monitoring region 23*a*. At that time, since decreasing of variance is monitored all the time, it is judged that variance has apparently decreased in a short time.

By comparing an average value of the past variances with the current variance, a real decrease extent is detected at a position indicated by P2 in FIG. 16, thus avoiding a possible mis-detection at the position P1.

In other words, an absolute value of variance is compared with a threshold according to the first method, and a relative value of variance is compared with another threshold according to the second method. The first through fourth thresholds are values set for comparison and should by no means be limited to the illustrated examples. Various alternatives may be suggested in accordance with guidelines of designing. Further, the first and second thresholds may be either identical with each other or different from each other. The third and fourth thresholds also may be either identical with each other or different from each other.

Furthermore, detection of entering of an object and detection of leaving of the object may be carried out in combination. For example, when variance is equal to or higher than the first threshold to detect the entering of an object, appearance of an object may be notified, and when the increase of variance is equal to or larger than the fourth threshold to detect the leaving of an object, absence of any object may be notified. And when the increase of variance is equal to or larger than the third threshold to detect the entering of an object, appearance of an object may be notified, and when variance is equal to or lower than the second threshold to detect the leaving of an object, absence of an object may be notified.

It is thereby possible to facilitate detecting the entering and leaving of an object.

How to detect the direction of movement of an object using variances will now be described. In the moving direction detection, like the above-mentioned object detection, first of all, a monitoring region 23*a* is clipped from the input image (monitoring region clipping step).

Figure 17:
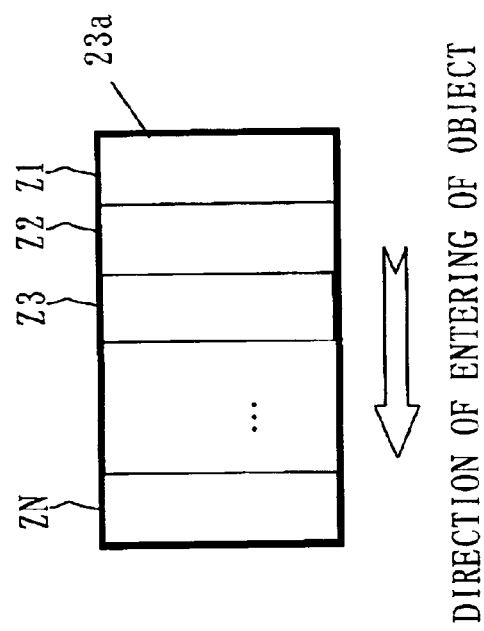
FIG. 17 is a diagram showing a succession of zones obtained by dividing a monitoring region.

FIG. 17 is a diagram showing a plurality of zones as the result of dividing the monitoring area 23*a*. Assuming that an object enters the monitoring area 23*a* from right to left in FIG. 17, the monitoring area 23*a* is divided perpendicularly to the direction of entering of the object to thereby create N (N is an integer) zones Z1, Z2, . . . , ZN (first zone creating step). Then variance of brightness values is calculated for each of the created zones Z1, Z2, . . . , ZN (variance calculating step). Then the obtained variance is compared with a predetermined value to discriminate whether the individual zone Z1, Z2, . . . , ZN is an appearance-of-object zone, in which an object appears, or a devoid-of-object zone, in which no object appears (zone discriminating step). In the meantime, the direction of movement of an object is recognized based on the direction of occurrence of the appearance-of-object zone (moving direction recognizing step).

Figure 18:
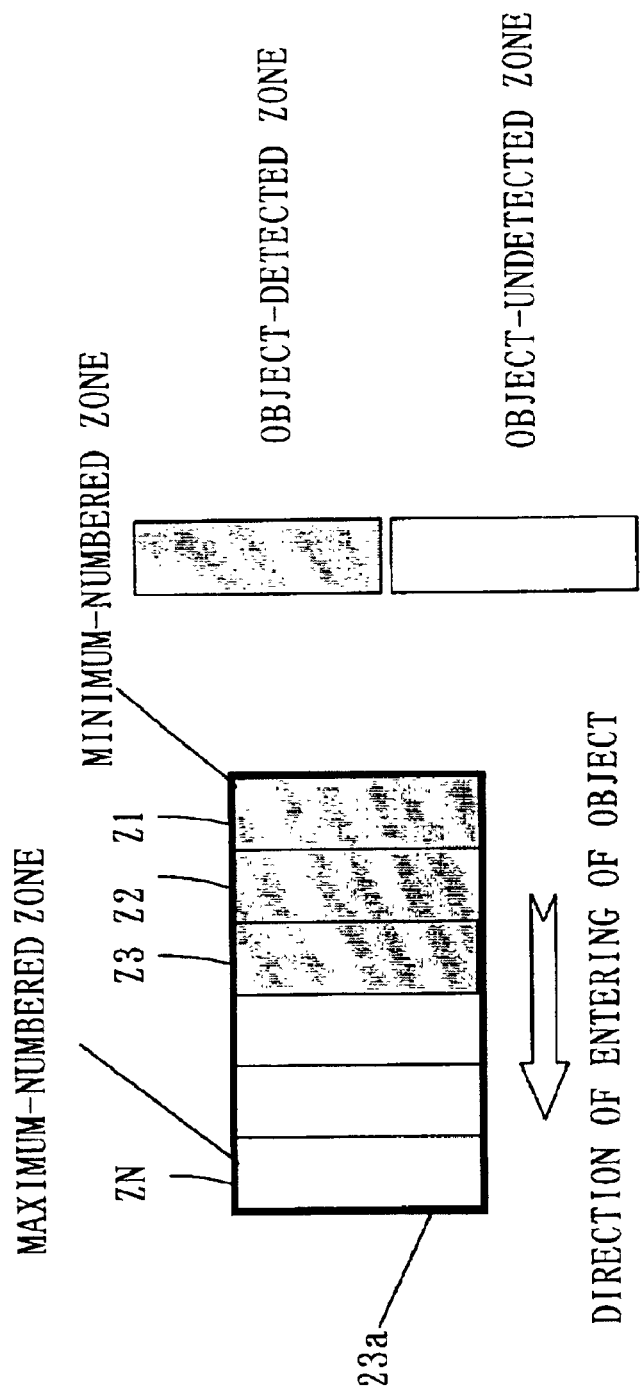
FIG. 18 is a diagram illustrating the manner in which an object is detected in a succession of zones.

FIG. 18 illustrates how to detect an object in a succession of zones. Out of the zones Z1, Z2, . . . , ZN of FIG. 18; the object-detected zones Z1, Z2, Z3, in which an object has been detected, are half-toned, and the object-undetected zones ZN, in which no object has been detected, are left unhalf-toned.

The discrimination between the object-detected zone and the object-undetected zone, like the above-mentioned object detection, is exemplified by two methods. According to the first discriminating method, the individual zone Z1, Z2, . . . , ZN is judged as an appearance-of-object zone when variance is equal to or higher than a predetermined value, and is judged as a void-of-object zone when variance is lower than a predetermined value. In addition, the individual zone Z1, Z2, . . . , ZN is judged as an appearance-of-object zone when the extent of variation of variances is equal to or larger than a predetermined value, and is judged as a void-of-object zone when the extent of variation of variances is smaller than a predetermined value. Namely, discrimination is made as an absolute value of variance or a relative value of variance variation is compared with a predetermined value. This predetermined value is created from the average value of variance of the past brightness values.

Then, as shown in FIG. 18, if appearance of an object has been detected successively in the zones Z1, Z2, Z3, the zones Z1, Z2, Z3 are judged as zones in which an object has entered. Of these last-named zones, a minimum-numbered zone Z1, whose zone number is minimal, and a maximum-numbered zone Z3, whose zone number is maximal, are extracted. The term "minimum-numbered zone" means a zone Z1 from which an object has entered into the monitoring region 23*a*, and the term "maximum-numbered zone" means a zone Z3 toward which the object has moved in the monitoring region 23*a*.

Further, using either the first discriminating method or the second discriminating method, the direction of movement of an object is recognized. For example, when detecting that an object leaves from the monitoring region 23*a*, there occurs no great difference in change between the images before and after the object has entered. Therefore, by comparing the previously recorded variance of the image, which is before the object has entered, with the variance of the current image, it is possible to realize detection with high precision. These two discriminating methods may be selectively used one to detect the entering of an object into the monitoring region 23*a* and the other to detect the leaving of an object from the monitoring region 23*a*.

The signal (data) flow will now be described with reference to FIG. 9. First of all, a monitoring region 23*a* is trimmed from a motion image taken by the camera 50 by the input image extracting section 11. This monitoring region 23a is then retained in the input image retaining section 12. And variance is calculated for every zone by the moving direction recognizing section 15. The zone division information about how to divide the monitoring region 23a into zones Z1, Z2, ..., ZN are retained in the zone information retaining unit 15b, and the input image data retained in the input image retaining section is divided into a plurality of pieces of data one piece for each of zones Z1, Z2, ..., Zn, based on the zone division information output from the zone information retaining unit 15b, by the variance calculating unit 15a to thereby calculate variance of brightness values for every zone.

The variance history managing unit 15d retains and outputs the history information of the respective past variance of plural zones, and the variance judging unit 15c detects an object and judges the direction of movement of the object, based on both the variances calculated by the variance calculating unit 15a and the history information output from the variance history managing unit 15d. And the integrated judging unit 16 judges appearance of the object and the direction of movement of the object in an integrated manner.

Figure 19:
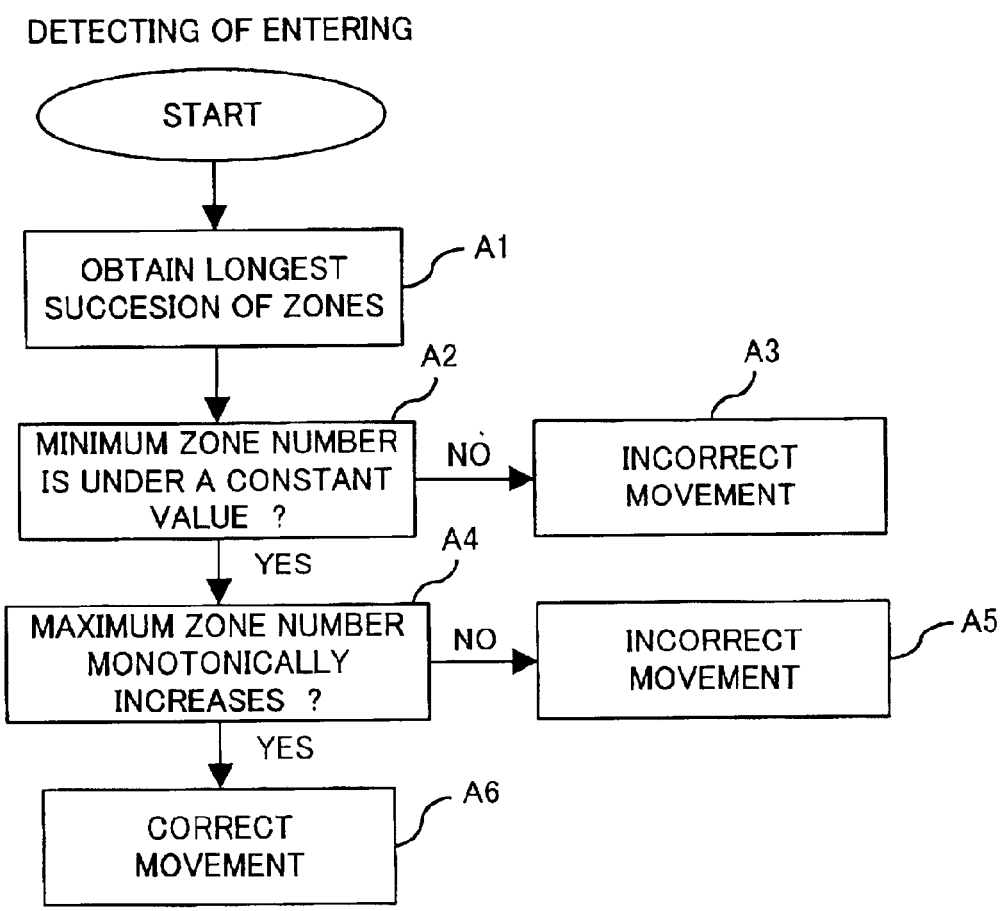
FIG. 19 is a flow diagram showing the procedure in which a direction of movement of an object is detected according to the second embodiment.

With this construction, detection of entering of an object and detection of leaving of an object can be carried out. FIG. 19 is a flow diagram illustrating how to detect the direction of movement of an object according to the second embodiment. First of all, a plurality of successive zones are obtained, and a longest succession of zones, in which a largest number of zones succeed, is obtained (step A1). In this longest succession of zones, it is discriminated whether or not the minimum zone number is 1 or a smaller number close to 1 (step A2). If the minimum zone number is 1 or a smaller number close to 1, the procedure takes YES route to go to step A4 at which it is discriminated whether or not the maximum zone number increases monotonically, based on the history information from the variance history managing unit 15d. If the maximum zone number increases monotonically, the procedure takes YES route to go to step A6 at which it is judged that the movement of the object is a correct movement.

Otherwise, if the minimum zone number is not 1 or a smaller number close to 1 (step A2), the procedure takes NO route to go to step A3 at which it is judged that the movement of the object is an incorrect movement. Likewise, if the maximum zone number does not increase monotonically (step A4), the procedure takes NO route to go to step A5 at which the movement of the object is an incorrect movement.

Thus if the minimum zone number is neither 1 nor a smaller number close to 1 and the maximum zone number increases monotonically, it is judged that the object enters; since, if otherwise, it is judged that an ignorable object other than an intended object to be detected enters, an error-free detection can be achieved.

Figure 20:
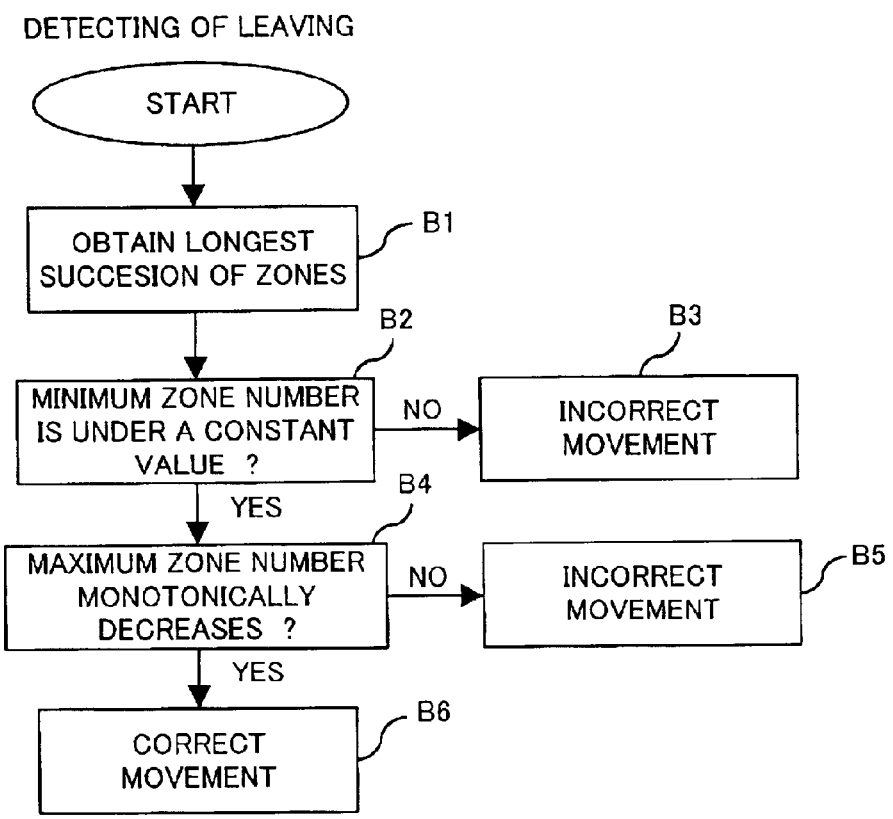
FIG. 20 is a flow diagram showing the procedure in which a direction of movement of an object is detected when the object goes out according to the second embodiment.

FIG. 20 is a flow diagram illustrating how to detect the direction of movement of an object, when it leaves from the monitoring region 23a, according to the second embodiment. During detection of a leaving object, like detection of an entering object, first of all, the variance judging unit 15c obtains a plurality of successive zones, and a longest succession of zones, in which a largest number of zones succeed, are obtained (step B1). In the longest number of successive zones, it is discriminated whether or not the minimum zone number is 1 or a smaller number close to 1 (step B2). If the minimum zone number is 1 or a smaller number close to 1, the procedure takes YES route to go to step B4 at which it is discriminated whether or not the maximum zone number decreases monotonically, based on the history information from the variance history managing unit 15d. If the maximum zone number decreases monotonically, the procedure takes YES route to go to step B6 at which it is judged that the movement of the object is a correct movement.

Otherwise, if the minimum zone number is not 1 or a smaller number close to 1 (step B2), the procedure takes NO route to go to step B3 at which it is judged that the movement of the object is an incorrect movement. Likewise, if the maximum zone number does not decrease monotonically (step B4), the procedure takes NO route to go to step B5 at which the movement of the object is an incorrect movement.

Thus if the minimum zone number is not 1 or a smaller number close to 1 and the maximum zone number decreases monotonically, it is judged that the object leaves; since, if otherwise, it is judged that an ignorable object other than an intended object to be detected leaves, an error-free detection can be achieved.

Thus, according to the second embodiment, by capturing variations of variance due to the movement of an object, it is possible to detect both an object and the direction of movement of the object with precision. It is therefore possible to detect only an intended moving object stably even in a non-stable environment, such as outdoor.

(B1) Modification of the Second Embodiment

In this modification, the detection method of the second embodiment is combined with that of the first embodiment to detect a moving object with improved precision.

Figure 21:
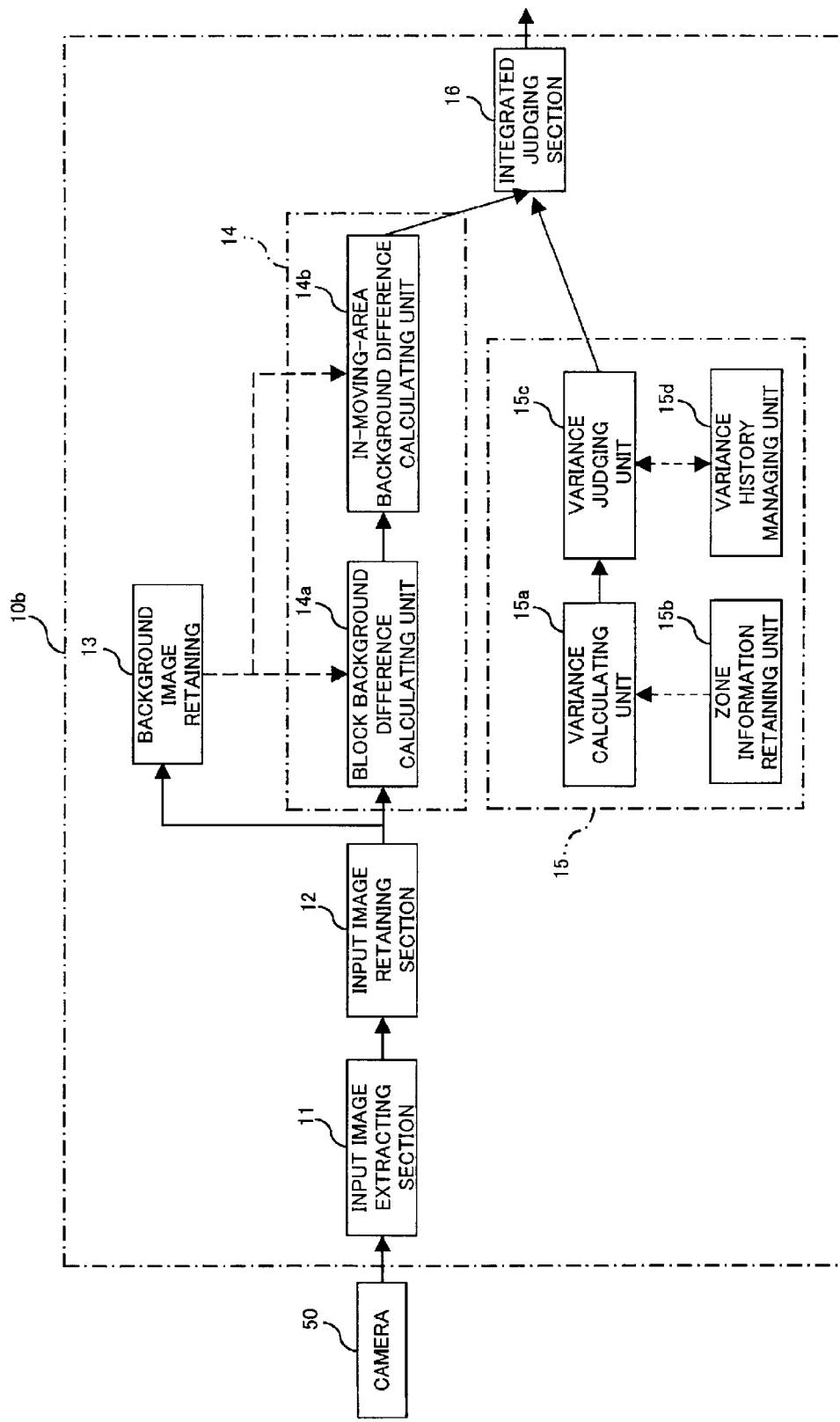
FIG. 21 is a block diagram showing a moving object detecting apparatus according a modification of the second embodiment.

FIG. 21 is a block diagram showing a hybrid moving object detecting apparatus according to this modification of the second embodiment. This hybrid moving object detecting apparatus 10b of FIG. 21 detects a moving area, in which an movement has occurred, from input digital motion image data and automatically extracts a movement of an object from an input image. For this purpose, the moving object detecting apparatus 10 comprises an input image extracting section 11, an input image retaining section 12, a background image retaining section 13, a background difference calculating section 14, an moving direction recognizing section 15 and an integrated judging section 16. The integrated judging section 16 is connected to the background difference calculating section 14 and the moving direction recognizing section 15 for making a judgment on appearance of an object and direction of movement of the object. In FIG. 21, elements or parts similar in function to those described in connection with the first and second embodiments are designated by the same reference numbers, so any repetitive description is omitted here. In FIG. 21, a solid-line arrow indicates a flow of data, and a dotted-line arrow indicates both a flow of data and the direction of referring the data.

The input image extracting section 11 extracts, as in input image, the individual motion picture taken by the camera 50. Then a block background difference calculating unit 14a in the background difference calculating section 14 measures a vector distance between the input image and the background image by subtracting an average value from the individual vector factor as assumed that the individual pixels in a unit block 20 are vector factors. If the measured vector distance is equal to or larger than a predetermined value, it is recognized that a change has occurred in shape of distribution of brightness values, namely, occurrence of a movement.

Then the in-moving-area background difference calculating unit 14b, in which a moving area 22 surrounding the extracted moving blocks 21 is set, calculates a difference in shape of distribution of brightness values between the input image and the background image in the moving area 22 to thereby detect appearance of an object in the input image.

In short, the background difference is utilized in detection of an object.

In the meantime, the moving direction recognizing section 15 utilizes variance to detect a moving object and the direction of movement of the object. A zone information retaining unit 15b retains and outputs division information (hereinafter also called the zone division information) relating to division of the input image into a plurality of zones Z1, Z2, ..., ZN. And a variance calculating unit 15a divides the input image data, which is retained in the input image retaining section 12, into a plurality of pieces of data one piece for each zone Z1, Z2, ..., ZN based on the zone division information output from the zone information retaining unit 15b and calculates variance of brightness values for each and every zone Z1, Z2, ..., ZN.

Further, a variance history managing unit 15d retains and outputs history information about past variance values for the individual zones. And a variance judging unit 15c detects an object and determines the direction of movement of the object based on both the variance values calculated by the variance calculating unit 15a and the history information output from the variance history managing unit 15d.

Figure 22:
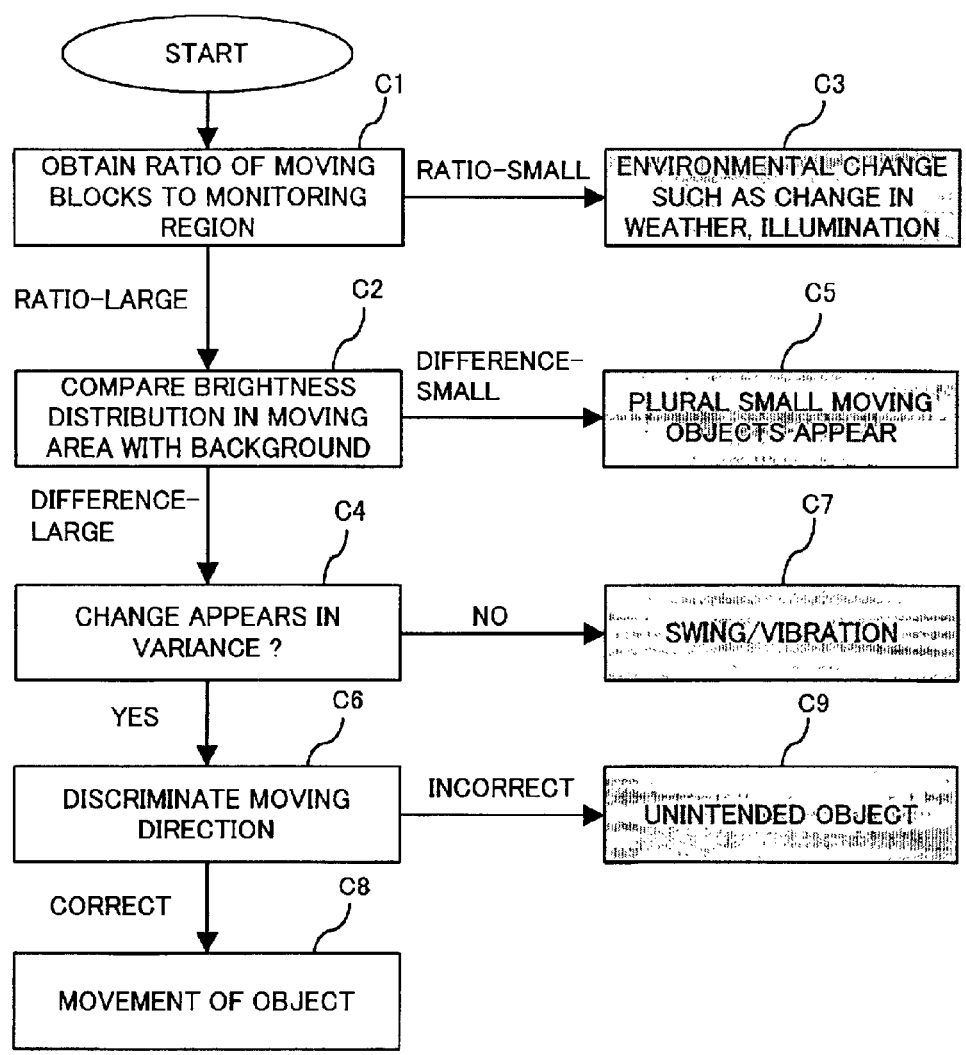
FIG. 22 is a flow diagram showing the procedure in which an object is detected in the moving object detecting apparatus according to the modification of the second embodiment.

Then the integrated judging section 16 judges appearance of an object and the direction of movement of the object in an integrated manner. FIG. 22 is a flow diagram illustrating how to detect an object in the hybrid moving object detecting apparatus 10b according to this modification of the second embodiment. First of all, at step C1, a ratio of the moving blocks 21 occupying in the monitoring region 23 (or 23a) is obtained. If the ratio is large, the procedure takes RATIO-LARGE route to go to step C2 at which comparison in brightness distribution in the moving area 22 takes place. At step C1, if the ratio of the moving blocks 21 is small, the procedure takes RATIO-SMALL route to go to step C3 at which no object is detected as the change in brightness distribution between the input image and the background image is recognized as an environmental change due to weather change, illumination or any ignorable cause.

Further, at step C2, a difference in brightness between the moving area 22 and the background image is calculated. If the calculated difference is large, the procedure takes DIFFERENCE-LARGE route to go to step C4. If the difference is small, the procedure takes DIFFERENCE-SMALL route to go to step C5 at which no object is detected as the change in brightness distribution is recognized as a change due to occurrences of plural small-sized moving objects, which are ignorable.

Then at step C4, a change in variance is calculated. If a change occurs in variance, the procedure takes YES route to go to step C6. Otherwise if no change occurs in variance, the procedure takes NO route to go to step C7 at which no object is detected as the change is recognized as a change due to swing or vibration of the camera 50.

In addition, at step C6, the direction of movement of an object is discriminated. If the direction of movement is correct, the procedure takes CORRECT route to go to step C8 at which the movement of the object is detected. Otherwise if the direction of movement is incorrect, the procedure takes INCORRECT route to go to step C9 at which no object is detected as the change in variance is recognized as a change due to another movement of the object and hence ignorable object.

According to this modification of the second embodiment, since the method of the first embodiment, in which a moving object in the input image is detected by calculating a difference in brightness distribution between the input image and the background image, and the method of the second embodiment, in which a moving object is detected utilizing variance, are combined, it is possible to detect a moving object with improved precision.

Further, since the moving object detecting method utilizing variance does not require a difference between the input image and the background image, it is possible to detect a moving object stably even when the camera 50 encounters swing or vibration, which would be a cause for misdetection.

Furthermore, since a difference between the input image and the background image is calculated, it is possible to detect the position and area of an object with high resolution and also to realize a precise detection which is free of any effect due to swing or vibration of the camera 50.

For additional advantageous features, it is possible to facilitate making a discrimination between a single large-sized object and a plurality of small-sized objects, irrespective of the environmental change such as due to turning on and off the light or changing over the illumination.

(C) Other Modifications

The present invention should by no means be limited to the illustrated embodiments and modification, and various other modifications may be suggested without departing from the gist of the invention.

For example, the moving area 22, which is oval in shape in the first embodiment as shown in FIG. 4(b), may have a rectangular (quadrilateral) shape.

Figure 23:
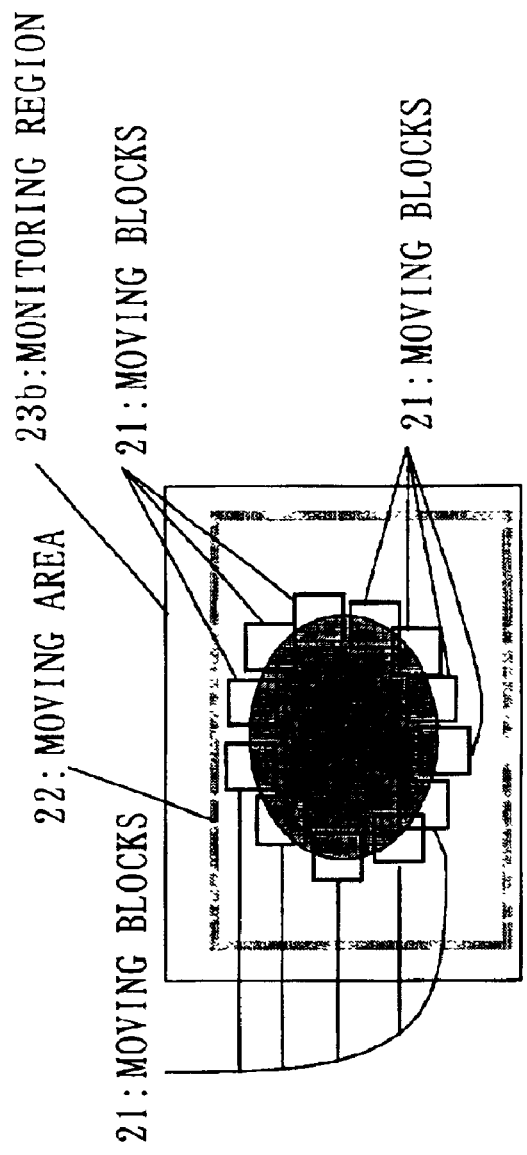
FIG. 23 is a diagram showing a monitoring region when a moving area is rectangular.
Figure 24:
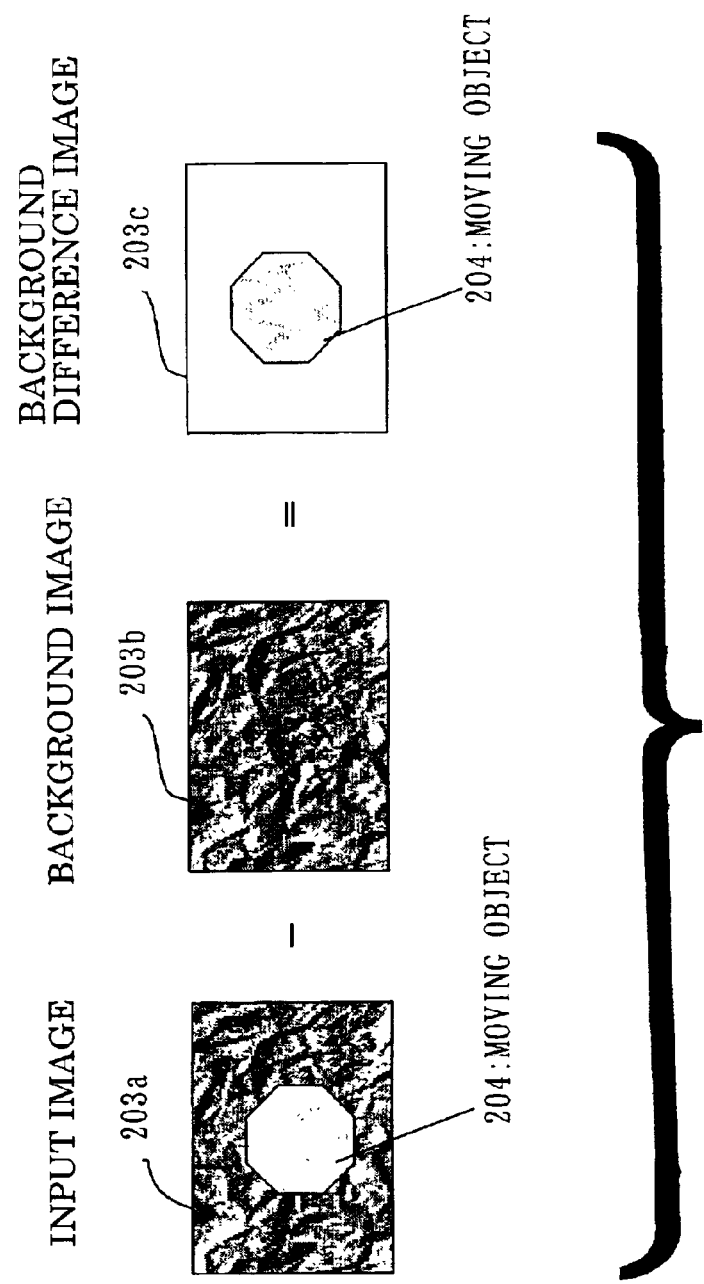
FIG. 24 a diagram illustrating a background subtraction method.
Figure 25:
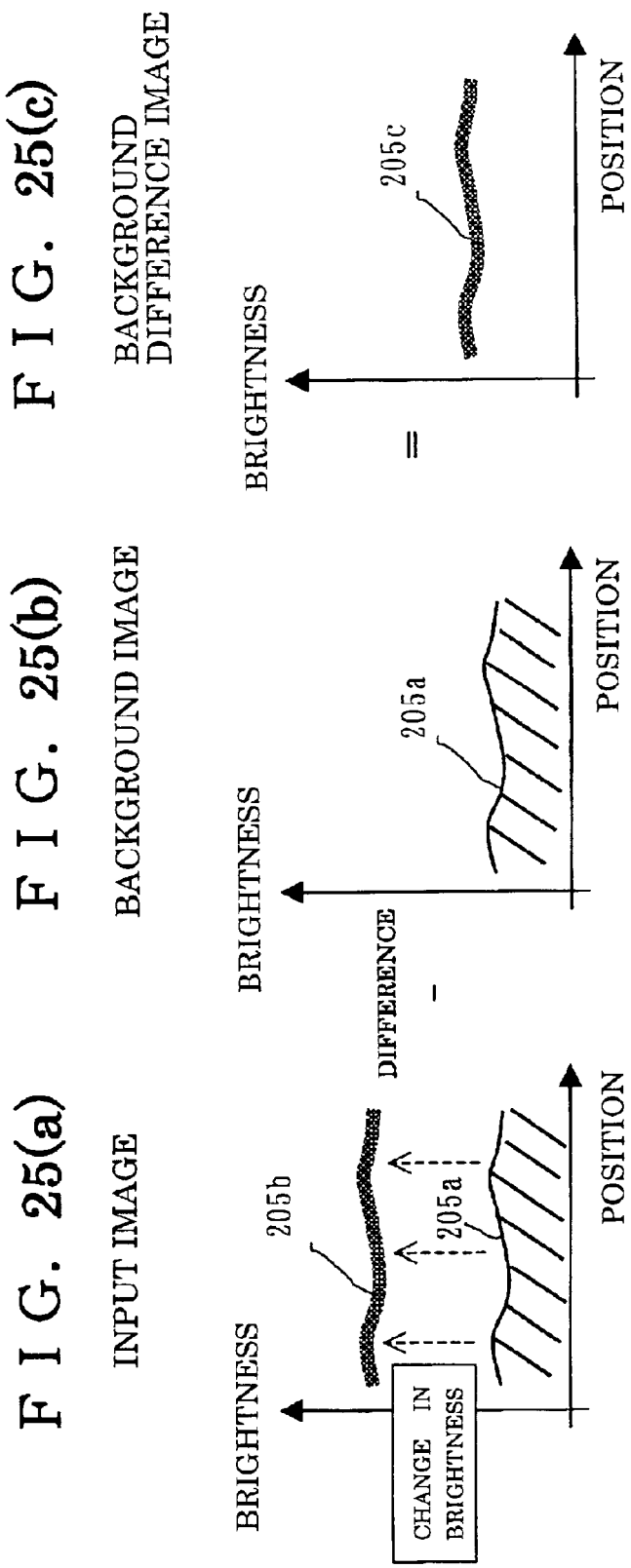
FIGS. 25(a) through 25(c) are graphs respectively illustrating the procedure in which an error due to an environmental change using the background subtraction method.
Figure 26:
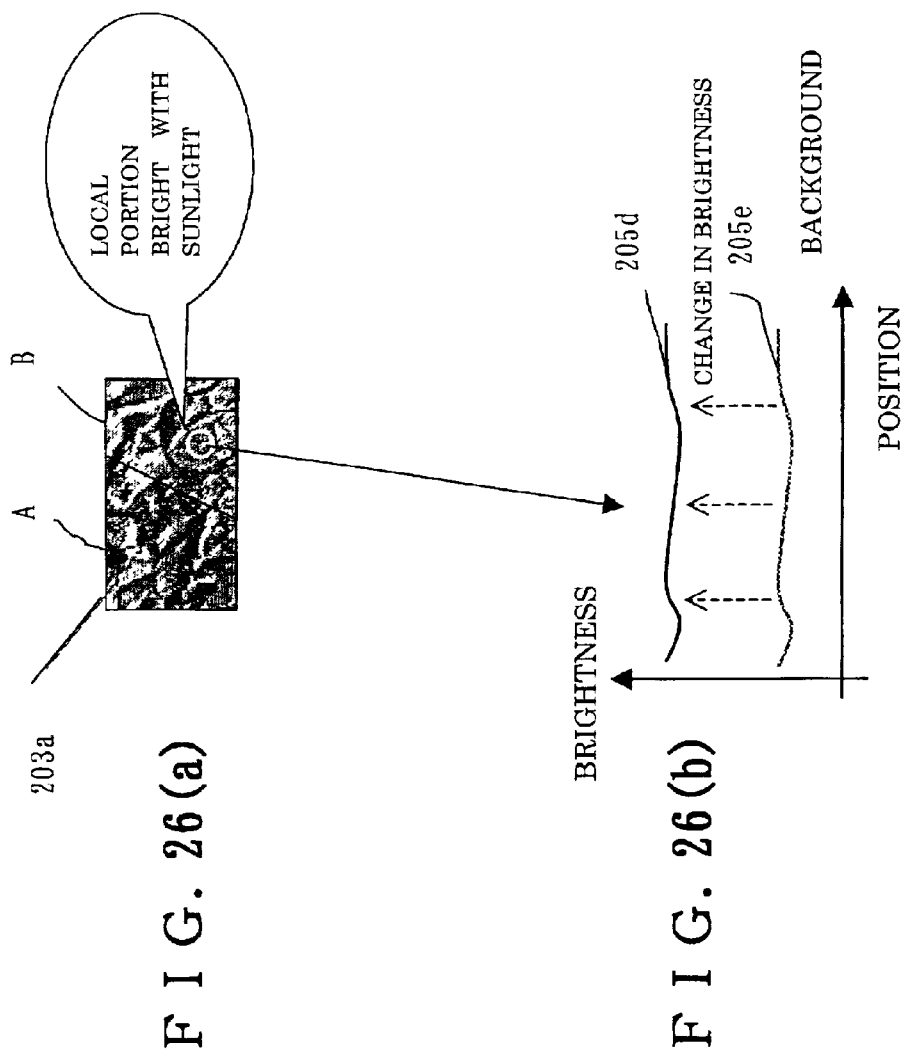
FIGS. 26(a) and 26(b) are a view and a graph respectively illustrating a change in brightness due to an environmental change.
Figure 31:
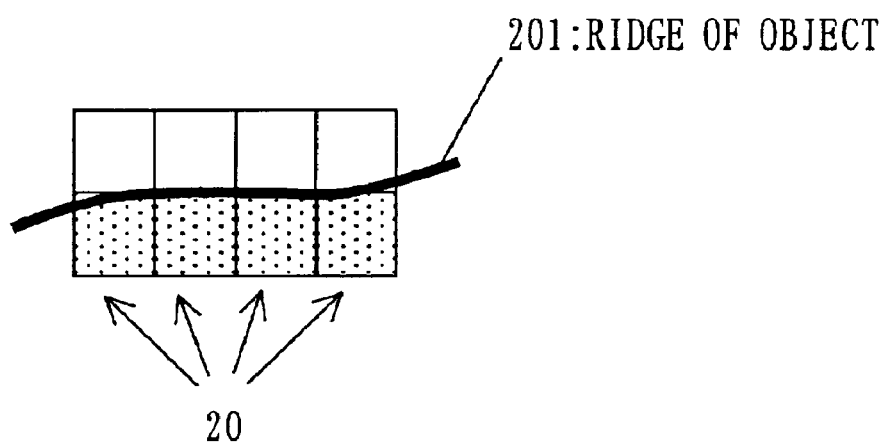
FIG. 31 is a diagram showing an arrangement diagram of unit blocks and a ridge of an object.
Figure 32:
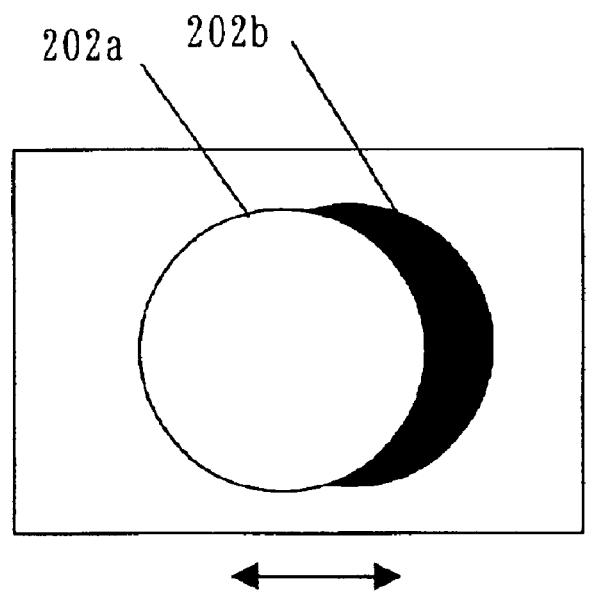
FIG. 32 is a diagram showing an input image when a camera has encountered vibration.

FIG. 23 shows a monitoring region 23b when a moving area 22 has a rectangular shape such as to surround the moving blocks 21. Given that the moving area 22 is set to be rectangular in shape, (x, y) coordinates can be utilized, it is possible to reduce an amount of arithmetic operation for retrieving in program processing.

Further, in the second embodiment, the monitoring region 23a is divided into a plurality of zones. Alternatively, instead of dividing, variances may be calculated for the original monitoring area 23a to execute detection of an object and detection of the direction of movement of the object.

What is claimed is:

1. A method of detecting a moving object, comprising:
(a) a first dividing step of dividing an input image into a plurality of first unit blocks;
(b) a second dividing step of dividing a given background image into a plurality of second unit blocks;
(c) a moving block extracting step of comparing said first unit blocks with said second unit blocks for every unit block and extracting a number of said first unit blocks, which are different in brightness distribution pattern from the corresponding second unit blocks, as moving blocks;
(d) a moving area setting step of setting a moving area that surrounds said moving blocks extracted in said moving block extracting step; and
(e) a brightness comparing step of comparing a distribution of brightness values of the input image with a distribution of brightness values of the background image in the moving area, which is set by said moving area setting step, to discriminate whether or not a moving object appears in the input image based on a size of the moving object.

2. A moving object detecting method according to claim 1, wherein said brightness comparing step includes:
- an appearance frequency measuring step of measuring a frequency of occurrence of pixels having a predetermined brightness value; and
- a trimming step of trimming the pixels, whose appearance frequency is lower than the predetermined value, from the pixels of the input image in the whole range of various brightness values.

3. A moving object detecting method according to claim 1, wherein in said moving area setting step, said moving area surrounding the moving blocks is rectangular in shape.

4. A method of detecting a moving object, comprising:
(a) a first dividing step of dividing an input image into a plurality of first unit blocks;
(b) a second dividing step of dividing a given background image into a plurality of second unit blocks;
(c) a moving block extracting step of comparing said first unit blocks with said second unit blocks for every unit block and extracting a number of said first unit blocks, which are different in brightness distribution pattern from the corresponding second unit blocks, as moving blocks;
(d) a moving area setting step of setting a moving area that surrounds said moving blocks extracted in said moving block extracting step; and
(e) a brightness comparing step of comparing a distribution of brightness values of the input image with a distribution of brightness values of the background image in the moving area, which is set by said moving area setting step, to discriminate whether or not a moving object appears in the input image,
wherein in each of said first dividing step and said second dividing step, the individual first unit block overlaps neighboring unit blocks disposed adjacent to the last-named first unit block.

5. A method of detecting a moving object, comprising:
(a) a monitoring region clipping step of clipping a monitoring region, which is to be monitored, from an input image;
(b) a region dividing step of dividing the monitoring region, which is clipped in said monitoring region clipping step, into a plurality of zones;
(c) a variance calculating step of calculating a variance of brightness values for each and every one of the plural zones obtained in said region dividing step; and
(d) an appearance detecting step of discriminating whether or not a moving object appears in the input image based on the variance calculated in said variance calculating step,
wherein said appearance detecting step includes:
- a history information creating step of creating history information about the variance calculated for every one of the plural zones obtained in said region and dividing step; and
- a variance comparing step of comparing the past variance before a current time based on the history information created in said history information creating step with the current variance in the current time based on the input image to discriminate whether an moving object appears in the input image.

6. A moving object detecting method according to claim 5, wherein in said appearance detecting step,
if the number of the zones whose variance is equal to or higher than a first threshold is equal to or larger than a predetermined value, the appearance of the moving object is notified, and
if the number of the zones whose variance is equal to or lower than a second threshold is equal to or larger than a predetermined value, the absence of the moving object is notified.

7. A moving object detecting method according to claim 5, wherein in said appearance detecting step,
if the number of the zones whose increase value of variance is equal to or higher than a third threshold is equal to or larger than a predetermined value, the appearance of the moving object is notified, and
if the number of the zones whose decrease value of variance is equal to or higher than a fourth threshold is equal to or larger than a predetermined value, the absence of the moving object is notified.

8. A moving object detecting method according to claim 7, wherein in said appearance detecting step, a reference value, based on which the increase value of variance and the decrease value of variance are to be calculated, is created from average values of the past variances before the current time.

9. A moving object detecting method according to claim 5, wherein in said appearance detecting step,
if the variance from which entering of the moving object is to be detected is equal to or higher than a first threshold, the appearance of the moving object is notified, and
if the decrease value of variance from which leaving of the moving object is to be detected is equal to or larger than a fourth threshold, the absence of the moving object is notified.

10. A moving object detecting method according to claim 5, wherein in said appearance detecting step,
if an increase value of variance from which entering of the moving object is to be detected is equal to or higher than a third threshold, the appearance of the moving object is notified, and
if the variance from which leaving of the moving object is to be detected is equal to or lower than a second threshold, the absence of the moving object is notified.

11. A moving object detecting method according to claim 5, wherein in said appearance detecting step, the monitoring region is set by expanding an assumed area of the moving object.

12. A method of detecting a moving object, comprising:
(a) a monitoring region clipping step of clipping a monitoring region, which is to be monitored, from an input image;
(b) a region dividing step of dividing the monitoring region, which is clipped in said monitoring region clipping step, into a plurality of zones;
(c) a variance calculating step of calculating a variance of brightness values for each and every one of the plural zones obtained in said region dividing step; and
(d) an appearance detecting step of discriminating whether or not a moving object appears in the input image based on the variance calculated in said variance calculating step, wherein in said appearance detecting step,
if the number of the zones whose variance is equal to or higher than a first threshold is equal to or larger than a predetermined value, the appearance of the moving object is notified, and if the number of the zones whose variance is equal to or lower than a second threshold is equal to or larger than a predetermined value, the absence of the moving object is notified.

13. A method of detecting a moving object, comprising:
(a) a monitoring region clipping step of clipping a monitoring region, which is to be monitored, from an input image;
(b) a region dividing step of dividing the monitoring region, which is clipped in said monitoring region clipping step, into a plurality of zones;
(c) a variance calculating step of calculating a variance of brightness values for each and every one of the plural zones obtained in said region dividing step; and
(d) an appearance detecting step of discriminating whether or not a moving object appears in the input image based on the variance calculated in said variance calculating step, wherein in said appearance detecting step,
if the number of the zones whose increase value of variance is equal to or higher than a third threshold is equal to or larger than a predetermined value, the appearance of the moving object is notified, and
if the number of the zones whose decrease value of variance is equal to or higher than a fourth threshold is equal to or larger than a predetermined value, the absence of the moving object is notified.

14. A moving object detecting method according to claim 13, wherein in said appearance detecting step, a reference value, based on which the increase value of variance and the decrease value of variance are to be calculated, is created from average values of the past variances before the current time.

15. A method of detecting a moving object, comprising:
(a) a monitoring region clipping step of clipping a monitoring region, which is to be monitored, from an input image;
(b) a region dividing step of dividing the monitoring region, which is clipped in said monitoring region clipping step, into a plurality of zones;
(c) a variance calculating step of calculating a variance of brightness values for each and every one of the plural zones obtained in said region dividing step; and
(d) an appearance detecting step of discriminating whether or not a moving object appears in the input image based on the variance calculated in said variance calculating step,
wherein in said appearance detecting step, if the variance from which entering of the moving object is to be detected is equal to or higher than a first threshold, the appearance of the moving object is notified, and
if the decrease value of variance from which leaving of the moving object is to be detected is equal to or larger than a fourth threshold, the absence of the moving object is notified.

16. A method of detecting a moving object, comprising:
(a) a monitoring region clipping step of clipping a monitoring region, which is to be monitored, from an input image;
(b) a region dividing step of dividing the monitoring region, which is clipped in said monitoring region clipping step, into a plurality of zones;
(c) a variance calculating step of calculating a variance of brightness values for each and every one of the plural zones obtained in said region dividing step; and
(d) an appearance detecting step of discriminating whether or not a moving object appears in the input image based on the variance calculated in said variance calculating step, wherein in said appearance detecting step,
if an increase value of variance from which entering of the moving object is to be detected is equal to or higher than a third threshold, the appearance of the moving object is notified, and
if the variance from which leaving of the moving object is to be detected is equal to or lower than a second threshold, the absence of the moving object is notified.

17. A method of detecting a moving object, comprising:
(a) a monitoring region clipping step of clipping a monitoring region, which is to be monitored, from an input image;
(b) a region dividing step of dividing the monitoring region, which is clipped in said monitoring region clipping step, into a plurality of zones;
(c) a variance calculating step of calculating a variance of brightness values for each and every one of the plural zones obtained in said region dividing step; and
(d) an appearance detecting step of discriminating whether or not a moving object appears in the input image based on the variance calculated in said variance calculating step, wherein in said appearance detecting step, the monitoring region is set by expanding an assumed area of the moving object.

18. A method of detecting a moving objection an input image, comprising:
(a) a monitoring region clipping step of clipping a monitoring region, which is to be monitored, from the input image;
(b) a first region dividing step of dividing the monitoring region, which is clipped in said monitoring region clipping step, into a plurality of zones in a direction perpendicular to a direction in which the moving object enters;
(c) a variance calculating step of calculating a variance of brightness values for each and every one of the plural zones obtained in said first region dividing step;
(d) a zone discriminating step of discriminating whether an individual one of the plural zones is an object-appearing zone in which the moving object appears or an object-free zone in which the moving object is absent, by comparing the variance obtained in said variance calculating step with a predetermined value; and
(e) a moving-direction recognizing step of recognizing a direction in which the moving object moves, based on a direction of occurrence of the object-appearing zone found as the result of discrimination in said zone discriminating step,
wherein said zone discriminating step uses a first discriminating way such that
if the variance is equal to or larger than said predetermined value, the plural zones are judged as the object-appearing zones, and
if the variance is equal to or smaller than said predetermined value, the plural zones are judged as the object-free zones.

19. A moving object detecting method according to claim 18, wherein in said moving-direction recognizing step, the direction of moving of the moving object is recognized using one of said first and second recognizing ways.

20. A method of detecting a moving object in an input image, comprising:
- (a) a monitoring region clipping step of clipping a monitoring region, which is to be monitored, from the input image;
- (b) a first region dividing step of dividing the monitoring region, which is clipped in said monitoring region clipping step, into a plurality of zones in a direction perpendicular to a direction in which the moving object enters;
- (c) a variance calculating step of calculating a variance of brightness values for each and every one of the plural zones obtained in said first region dividing step;
- (d) a zone discriminating step of discriminating whether an individual one of the plural zones is an object-appearing zone in which the moving object appears or an object-free zone in which the moving object is absent, by comparing the variance obtained in said variance calculating step with a predetermined value; and
- (e) a moving-direction recognizing step of recognizing a direction in which the moving object moves, based on a direction of occurrence of the object-appearing zone found as the result of discrimination in said zone discriminating step,
- wherein said zone discriminating step uses a second discriminating way such that
  - if the amount of change in the variance is equal to or larger than a predetermined value, the plural zones are judged as the object-appearing zones, and
  - if the amount of change in the variance is equal to or smaller than said predetermined value, the plural zones are judged as the object-free zones.

21. A moving object detecting method according to claim 20, wherein in said zone discriminating step, said predetermined value is created from an average value of the past variance of brightness values before the current time.

22. A moving object detecting method according to claim 21,
- wherein in said moving-direction recognizing step, the direction of moving of the moving object is recognized using one of said first and second recognizing ways.

23. A moving object detecting method according to claim 20, wherein in said moving-direction recognizing step, the direction of moving of the moving object is recognized using one of said first and second recognizing ways.

24. An apparatus for detecting a moving object in an input image, comprising:
- (a) an input image retaining section for retaining the input image;
- (b) a background image retaining section, connected to said input image retaining section, for retaining a given background image;
- (c) a background difference calculating section, connected to said input image retaining section and said background image retaining section, for (c1) calculating a difference between the input image and the background image, and for (c2) comparing an input-image-related unit block and a background-image-related unit block to extract a moving block which changes a shape in brightness distribution;
- (d) a moving direction recognizing section, connected to said input image retaining section, for dividing data of the input image into a plurality of pieces of data one piece for each of a plurality of zones and evaluating the data; and
- (e) a united judging section, connected to said background difference calculating section and said moving direction recognizing section, for judging the appearance of the moving object and the direction of moving of the moving object.

25. An apparatus for detecting a moving object, comprising:
- (a) an input image retaining section for retaining the input image;
- (b) a background image retaining section, connected to said input image retaining section, far retaining a given background image;
- (c) a background difference calculating section, connected to said input image retaining section and said background image retaining section, for calculating a difference between the input image and the background image;
- (d) a moving direction recognizing section, connected to said input image retaining section, for dividing data of the input image into a plurality of pieces of data one piece for each of a plurality of zones and evaluating the data; and
- (e) a united judging section, connected to said background difference calculating section and said moving direction recognizing section, for judging the appearance of the moving object and the direction of moving of the moving object,
- wherein said background difference calculating section includes:
  - a block-background difference calculating unit, connected to said input image retaining section and the background image retaining section, for comparing first unit blocks related to the input image with second unit blocks related to the background image to extract a moving block in which a change occurs in brightness distribution pattern; and
  - an in-moving-area background difference calculating unit, connected to said block-background difference calculating unit, for setting a moving area surrounding the extracted moving block and comparing the distribution pattern of brightness values of the input image and the distribution pattern of brightness values of the background image to discriminate whether the moving object appears in the input image.

26. An apparatus for detecting a moving object, comprising:
- (a) an input image retaining section for retaining the input image;
- (b) a background image retaining section, connected to said input image retaining section, for retaining a given background image;
- (c) a background difference calculating section, connected to said input image retaining section and said background image retaining section, for calculating a difference between the input image and the background image;
- (d) a moving direction recognizing section, connected to said input image retaining section, for dividing data of the input image into a plurality of pieces of data one piece for each of a plurality of zones and evaluating the data; and
- (e) a united judging section, connected to said background difference calculating section and said moving direction recognizing section, for judging the appearance of the moving object and the direction of moving of the moving object, wherein said moving direction recognizing section includes:

a zone information retaining unit for retaining and outputting zone division information related to division of the input image into the plural zones;

a variance calculating unit, connected to said zone information retaining unit and said input image retaining section, for dividing data of the input image, which is retained in said input image retaining section, into the plural pieces of data one piece for each the plural zones in accordance with the zone division information output from said zone information retaining unit, and for calculating variance of brightness values for every one of the plural zones;

a variance history managing unit for retaining and outputting history information related to the past variance before the current time and calculated for each and every one of the plural zones; and a variance evaluating unit, connected to said variance calculating unit and said variance history managing unit, for evaluating the variance calculated by said variance calculating unit and the history information output from said variance history managing unit.

27. A method of detecting a moving object in an input image, comprising:

(a) a monitoring region clipping step of clipping a monitoring region, which is to be monitored, from the input image;

(b) a first region dividing step of dividing the monitoring region, which is clipped in said monitoring region clipping step, into a plurality of zones in a direction perpendicular to a direction in which the moving object enters;

(c) a variance calculating step of calculating a variance of brightness values for each and every one of the plural zones obtained in said first region dividing step;

(d) a zone discriminating step of discriminating whether an individual one of the plural zones is an object-appearing zone in which the moving object appears or an object-free zone in which the moving object is absent, by comparing the variance obtained in said variance calculating step with a predetermined value; and (e) a moving-direction recognizing step of recognizing a direction in which the moving object moves, based on a direction of occurrence of the object-appearing zone found as the result of discrimination in said zone discriminating step.

* * * * *

UNITED STATES PATENT AND TRADEMARK OFFICE
CERTIFICATE OF CORRECTION

PATENT NO.     : 6,931,146 B2
DATED          : August 16, 2005
INVENTOR(S)    : Takahiro Aoki et al.

It is certified that error appears in the above-identified patent and that said Letters Patent is hereby corrected as shown below:

Column 26,
Line 29, delete "objection" and insert -- object in --.

Column 28,
Line 11, delete "far" and insert -- for --.

Signed and Sealed this

Eleventh Day of April, 2006

JON W. DUDAS
*Director of the United States Patent and Trademark Office*